(12) United States Patent
Goto et al.

(10) Patent No.: US 9,453,958 B2
(45) Date of Patent: Sep. 27, 2016

(54) LIGHT GUIDE PLATE AND ILLUMINATION APPARATUS

(71) Applicant: DAI NIPPON PRINTING CO., LTD., Tokyo (JP)

(72) Inventors: Masahiro Goto, Tokyo (JP); Hiroshi Sekiguchi, Tokyo (JP)

(73) Assignee: Dai Nippon Printing Co., Ltd., Shinjuku-Ku (JP)

(*) Notice: Subject to any disclaimer, the term of this patent is extended or adjusted under 35 U.S.C. 154(b) by 112 days.

(21) Appl. No.: 14/301,582

(22) Filed: Jun. 11, 2014

(65) Prior Publication Data
US 2015/0003105 A1    Jan. 1, 2015

(30) Foreign Application Priority Data

Jun. 17, 2013  (JP) ................... 2013-126861
Jun. 17, 2013  (JP) ................... 2013-126878

(51) Int. Cl.
F21V 8/00      (2006.01)
G02B 6/00      (2006.01)

(52) U.S. Cl.
CPC .......... G02B 6/0061 (2013.01); G02B 6/0038 (2013.01); *G02B 6/0076* (2013.01)

(58) Field of Classification Search
CPC  G02B 6/0011; G02B 6/0013; G02B 6/0015; G02B 6/0018; G02B 6/002; G02B 6/0023; G02B 6/0033; G02B 6/0035; G02B 6/0036; G02B 6/0038; G02B 6/0058; G02B 6/0061
See application file for complete search history.

(56) References Cited

U.S. PATENT DOCUMENTS

2008/0285307 A1* 11/2008 Aylward .............. G02B 6/0028
                                                          362/618
2010/0110551 A1*  5/2010 Lamansky ............ G02B 5/021
                                                          359/599

FOREIGN PATENT DOCUMENTS

JP          10-160938 A1    6/1998

* cited by examiner

*Primary Examiner* — Anh Mai
*Assistant Examiner* — Nathaniel Lee
(74) *Attorney, Agent, or Firm* — Burr & Brown, PLLC

(57) ABSTRACT

A light guide plate includes an extracting light guide layer having a pair of main surfaces. The extracting light guide layer includes a base portion having a pair of main surfaces, and a plurality of light diffusing portions provided in the base portion. The light guide plate can obscure extracting elements for extracting light.

18 Claims, 10 Drawing Sheets

LIGHT GUIDE PLATE AND ILLUMINATION APPARATUS

CROSS-REFERENCE TO RELATED APPLICATIONS

This application is based upon and claims the benefit of priority from Japanese Patent Application No. 2013-126861 and Japanese Patent Application No. 2013-126878, both filed on Jun. 17, 2013; the entire contents of which are incorporated herein by reference.

The entire contents of Japanese Patent Application No. 2014-081194, filed on Apr. 10, 2014 are incorporated herein by reference.

BACKGROUND OF THE INVENTION

1. Field of the Invention

The present invention relates to a light guide plate and an illumination apparatus including the light guide plate, and more particularly to a light guide plate which can obscure extracting elements for extracting light and to an illumination apparatus including the light guide plate.

2. Description of the Related Art

An illumination apparatus is known which uses a light guide plate and a light source disposed such that the light source faces a side surface of the light guide plate, as disclosed e.g. in JP 10-160938A. In the illumination apparatus, light that has been emitted by the light source travels in the light guide plate while repeating reflection at a pair of main surfaces of the light guide plate. A patterned diffusing material is provided on the back-side main surface of the light guide plate. The traveling direction of light traveling in the light guide plate is changed by the diffusing material, whereby the light will be incident on the main surface of the light guide plate at an angle less than the critical angle of total reflection and, therefore, exits the light guide plate via the main surface. Thus, the diffusing material functions as extracting elements for extracting light from the light guide plate. The pattern of the diffusing material is so determined as to be capable of achieving a desired distribution of the amount of exiting light along the light guide direction. In a typical example, when it is intended to make uniform the amount of exiting light from various points along the light guide direction, the pattern of the diffusing material is determined such that the area of the pattern increases with distance from the light source in view of the tendency of the amount of exiting light to decrease with distance from the light source.

However, an illumination apparatus that uses such a conventional light guide plate has the problem of visible appearance of a diffusing material for controlling the amount of exiting light from various points on the light guide plate. Especially when a diffusing/reflecting material is provided in a pattern, the pattern of the material will be perceived. This places limitations on the range of use of the conventional illumination apparatus because of problems in terms of appearance, such as deterioration of the design and a loss of high-grade appearance.

SUMMARY OF THE INVENTION

The present invention has been made in view of the above situation. It is therefore an object of the present invention to provide a light guide plate which can obscure extracting elements for extracting light, and to provide an illumination apparatus including the light guide plate.

A first light guide plate according to the present invention comprises an extracting light guide layer including: a base portion having a pair of main surfaces, and a light entrance-side surface which is a part of side surfaces lying between the pair of main surfaces and which is positioned on one side in a first direction; and light diffusing portions provided in the base portion.

In the first light guide plate according to the present invention, two adjacent light diffusing portions, lying next to each other in the first direction, may satisfy the following relation:

$$\tan(\mathrm{Arcsin}(n_L/n)) \le d/(h_1+h_2)$$

where d is the distance between the two light diffusing portions in the first direction, $h_1$ and $h_2$ are the heights of the two light diffusing portions in the normal direction of the extracting light guide layer, n is the refractive index of the extracting light guide layer, and $n_L$ is the refractive index of a layer lying adjacent to the extracting light guide layer and superimposed on one of the main surfaces.

In the first light guide plate according to the present invention, the heights of the light diffusing portions in the normal direction of the extracting light guide layer may not be equal.

In the first light guide plate according to the present invention, the height of at least one light diffusing portion in the normal direction of the extracting light guide layer may be higher than the height of at least one other light diffusing portion located on the one side in the first direction with respect to the one light diffusing portion.

In the first light guide plate according to the present invention, the height of a light diffusing portion in the normal direction of the extracting light guide layer may be not lower than the height of any other light diffusing portion located on the one side in the first direction with respect to the one light diffusing portion.

The first light guide plate according to the present invention may further comprise a low-refractive index layer disposed adjacent to the extracting light guide layer and having a lower refractive index than a refractive index of the base portion of the extracting light guide layer.

The first light guide plate according to the present invention may further comprise a cover layer disposed on the opposite side of the low-refractive index layer from the extracting light guide layer, and the low-refractive index layer may be a layer to bond the extracting light guide layer and the cover layer together.

The first light guide plate according to the present invention may further comprise a cover layer disposed on the opposite side of the low-refractive index layer from the extracting light guide layer, and the cover layer may have higher scratch resistance than a scratch resistance of the base portion of the extracting light guide layer.

In the first light guide plate according to the present invention, the widths of the light diffusing portions of the extracting light guide layer in the first direction may be equal.

In the first light guide plate according to the present invention, the light diffusing portions of the extracting light guide layer may be arranged with the same pitch in the first direction.

In the first light guide plate according to the present invention, the light diffusing portions may have an aspect ratio of not less than 0.1.

In the first light guide plate according to the present invention, grooves, arranged in the first direction with a space, may be formed in one of the pair of main surfaces of the base portion, and the light diffusing portions may be provided in the grooves.

In the first light guide plate according to the present invention, each light diffusing portion may comprise a matrix and a diffusing component dispersed in the matrix. The diffusing component may be comprised of white particles, for example, acrylic resin particles containing titanium oxide as an additive. The light diffusing portions may contain the acrylic resin particles in an amount of not less than 20 wt % and not more than 30 wt %. The white particles may have an average particle size (average diameter) of not less than 1 µm and not more than 30 µm. The cross-sectional area of each light diffusing portion in a cross-section perpendicular to the normal direction of the light guide plate may be larger than the square of the average particle size of the white particles. The width of each light diffusing portion in the first direction may be not less than the average particle size (average diameter) of the white particles.

In the first light guide plate according to the present invention, each light diffusing portion may extend linearly in a direction not parallel to the first direction.

A first illumination apparatus according to the present invention comprises: one of the above-described first light guide plates according to the present invention; and a light source disposed in a position facing the light entrance-side surface of the light guide plate.

A second light guide plate according to the present invention comprises: a main light guide layer having a first main surface and a second main surface, which oppose each other, and a light entrance-side surface which is a part of side surfaces lying between the first main surface and the second main surface and which is positioned on one side in a first direction; a low-refractive index layer provided on the first main surface of the main light guide layer and having a lower refractive index than the main light guide layer; and an extracting light guide layer superimposed on the main light guide layer on the side of the low-refractive index layer, wherein the first main surface includes a first zone and a second zone, and the low-refractive index layer is provided only in the first zone of the first main surface, wherein the extracting light guide layer has extracting elements, arranged in the first direction, for changing the traveling direction of light from the main light guide layer, and wherein the extracting elements are provided in a region facing both the first zone and the second zone.

In the second light guide plate according to the present invention, the extracting light guide layer may further has a base portion having a pair of main surfaces, and the extracting elements may be light diffusing portions provided in the base portion. In such a second light guide plate according to the present invention, each light diffusing portion may comprise a matrix and a diffusing component dispersed in the matrix. The diffusing component may be comprised of white particles, for example, acrylic resin particles containing titanium oxide as an additive. The light diffusing portions may contain the acrylic resin particles in an amount of not less than 20 wt % and not more than 30 wt %. The white particles may have an average particle size (average diameter) of not less than 1 µm and not more than 30 µm. The cross-sectional area of each light diffusing portion in a cross-section perpendicular to the normal direction of the light guide plate may be larger than the square of the average particle size of the white particles. The width of each light diffusing portion in the first direction may be not less than the average particle size (average diameter) of the white particles.

In the second light guide plate according to the present invention, the heights of the extracting elements in the normal direction of the extracting light guide layer may not be equal.

In the second light guide plate according to the present invention, the height of at least one extracting element in the normal direction of the extracting light guide layer may be higher than the height of at least one other extracting element located on the one side in the first direction with respect to the one light diffusing portion.

In the second light guide plate according to the present invention, the height of an extracting element in the normal direction of the extracting light guide layer may be not lower than the height of any other extracting element located on the one side in the first direction with respect to the one light diffusing portion.

In the second light guide plate according to the present invention, grooves, arranged in the first direction with a space, may be formed in one of the pair of main surfaces of the extracting light guide layer, and the extracting elements may be light diffusing portions formed in the grooves.

In the second light guide plate according to the present invention, said one of the pair of main surface may be the main surface that faces the main light guide layer or the main surface that faces oppositely from the main light guide layer.

In the second light guide plate according to the present invention, the light diffusing portions may have an aspect ratio of not less than 0.1.

The second light guide plate according to the present invention may further comprise a second low-refractive index layer disposed adjacent to the extracting light guide layer on the opposite side of the extracting light guide layer from the main light guide layer and having a lower refractive index than a reference index of the extracting light guide layer.

The second light guide plate according to the present invention may further comprise a cover layer disposed on the opposite side of the second low-refractive index layer from the extracting light guide layer, and the second low-refractive index layer may be a layer to bond the extracting light guide layer and the cover layer together.

In the second light guide plate according to the present invention, the cover layer may have higher scratch resistance than a scratch resistance of the extracting light guide layer.

In the second light guide plate according to the present invention, the extracting elements may be disposed adjacent to the second zone of the main light guide layer, and the difference in refractive index between the extracting elements and the main light guide layer may be smaller than the difference in refractive index between the low-refractive index layer and the main light guide layer.

In the second light guide plate according to the present invention, the widths of the extracting elements of the extracting light guide layer in the first direction may be equal.

In the second light guide plate according to the present invention, the extracting elements of the extracting light guide layer may be arranged with the same pitch in the first direction.

In the second light guide plate according to the present invention, each extracting element may extend linearly in a direction not parallel to the first direction.

The second light guide plate according to the present invention may further comprise a third low-refractive index layer provided on the second main surface of the main light guide layer and having a lower refractive index than the main light guide layer.

The second light guide plate according to the present invention may further comprise a cover layer disposed on the opposite side of the third low-refractive index layer from the main light guide layer, and the third low-refractive index layer may be a layer to bond the main light guide layer and the cover layer together.

In the second light guide plate according to the present invention, the cover layer may have higher scratch resistance than a scratch resistance of the main light guide layer.

A second illumination apparatus according to the present invention comprises: one of the above-described second light guide plates according to the present invention; and a light source disposed in a position facing the light entrance-side surface of the light guide plate.

The present invention makes it possible to obscure extracting elements for extracting light from the light guide plate.

DETAILED DESCRIPTION OF THE INVENTION

Figure 1:
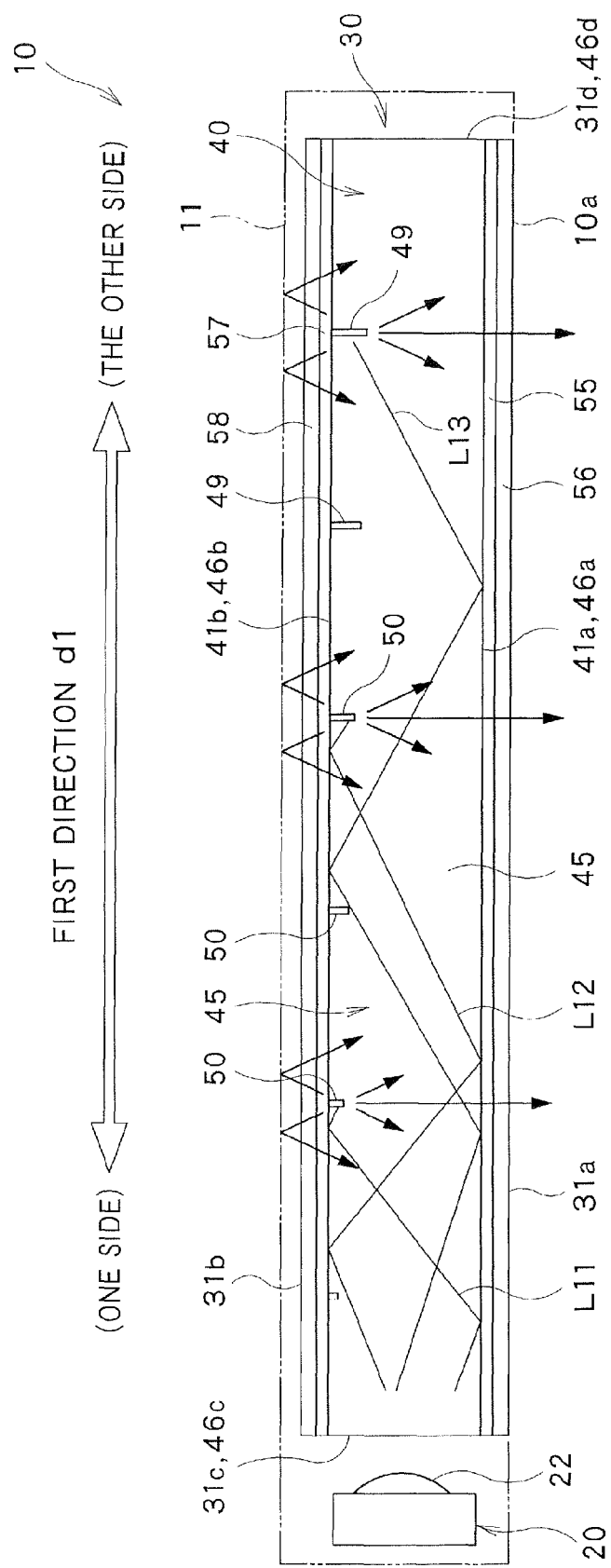
FIG. 1 is a vertical sectional view of an illumination apparatus and a light guide plate, illustrating an embodiment of the present invention.

First and second embodiments of the present invention will now be described with reference to the drawings. FIGS. 1 through 5 are diagrams illustrating a first embodiment of the present invention and a variation thereof. FIGS. 6 through 10 are diagrams illustrating a second embodiment of the present invention and variations thereof.

In the drawings attached to the present specification, for the sake of illustration and easier understanding, scales, horizontal to vertical dimensional ratios, etc. are exaggeratingly modified from those of the real things.

The terms "plate", "sheet" and "film" are not used herein to strictly distinguish them from one another. Thus, the term "plate" includes a member which can also be called a sheet or film; and a "light guide plate" is not strictly distinguished from a member called a "light guide sheet" or "light guide film"

The term "plate plane (sheet plane, film plane)" herein refers to a plane which coincides with the planar direction of an objective plate-like member (sheet-like member, film-like member) when taking a wide and global view of the plate-like member. In the below-described first embodiment, the plate plane of a light guide plate, the plate plane of the extracting light guide layer of the light guide plate, and the plate plane of the base portion of the extracting light guide layer are parallel to each other. In the below-described second embodiment, the plate plane of a light guide plate, the plate plane of the main light guide layer of the light guide plate, the plate plane of the extracting light guide layer of the light guide plate, and the plate plane of the base portion of the extracting light guide layer are parallel to each other.

The terms used herein to specify shapes or geometric conditions, such as "parallel", "perpendicular", "same", etc., and the below-described values for length and angle should not be bound to their strict sense, and should be construed to include equivalents or resemblances from which the same function or effect can be expected.

First Embodiment

At the outset, a first embodiment of the present invention will be described.

Figure 2:
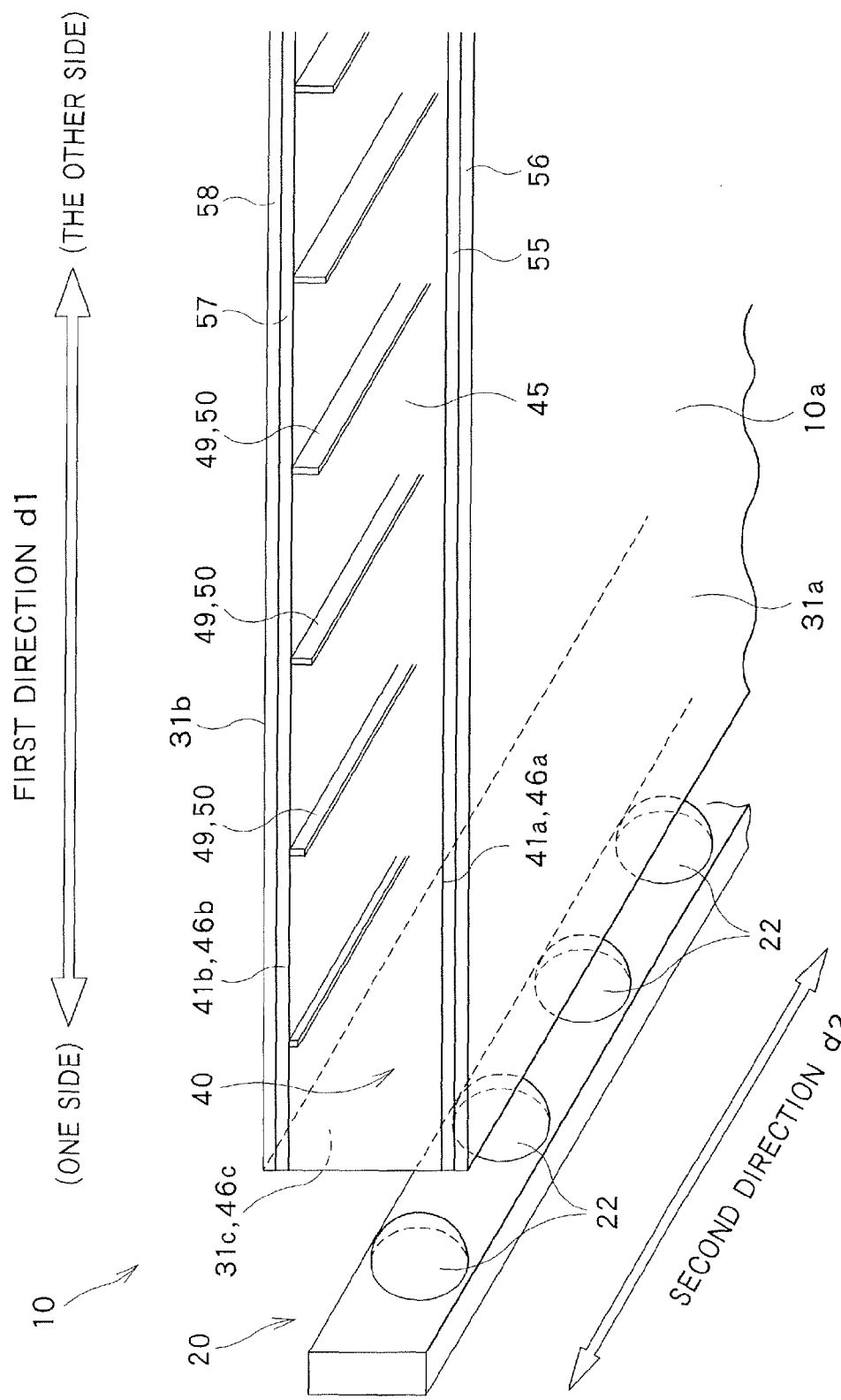
FIG. 2 is a partial perspective view of the illumination apparatus and the light guide plate.
Figure 3:
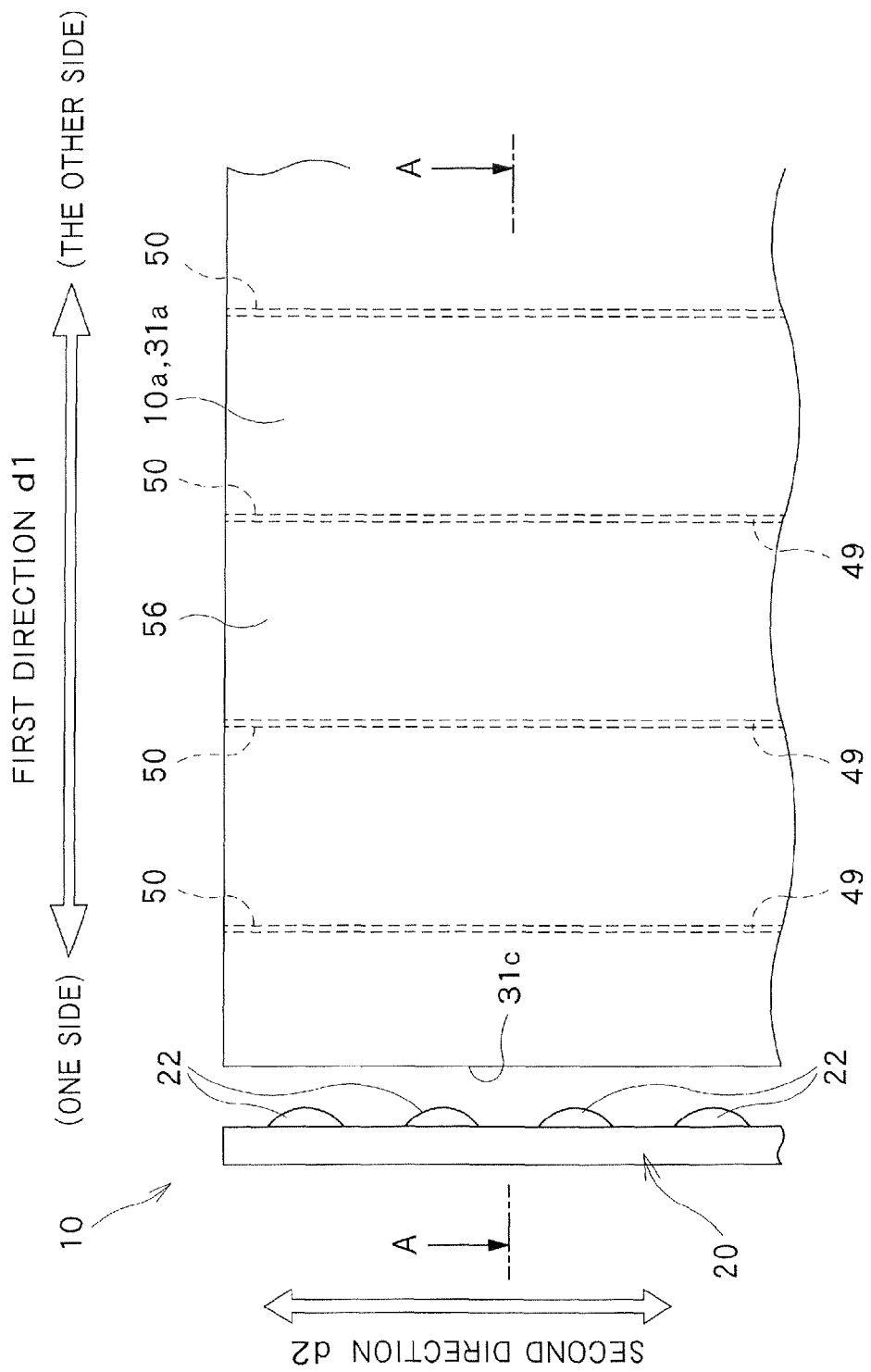
FIG. 3 is a plan view of the illumination apparatus and the light guide plate.
Figure 4:
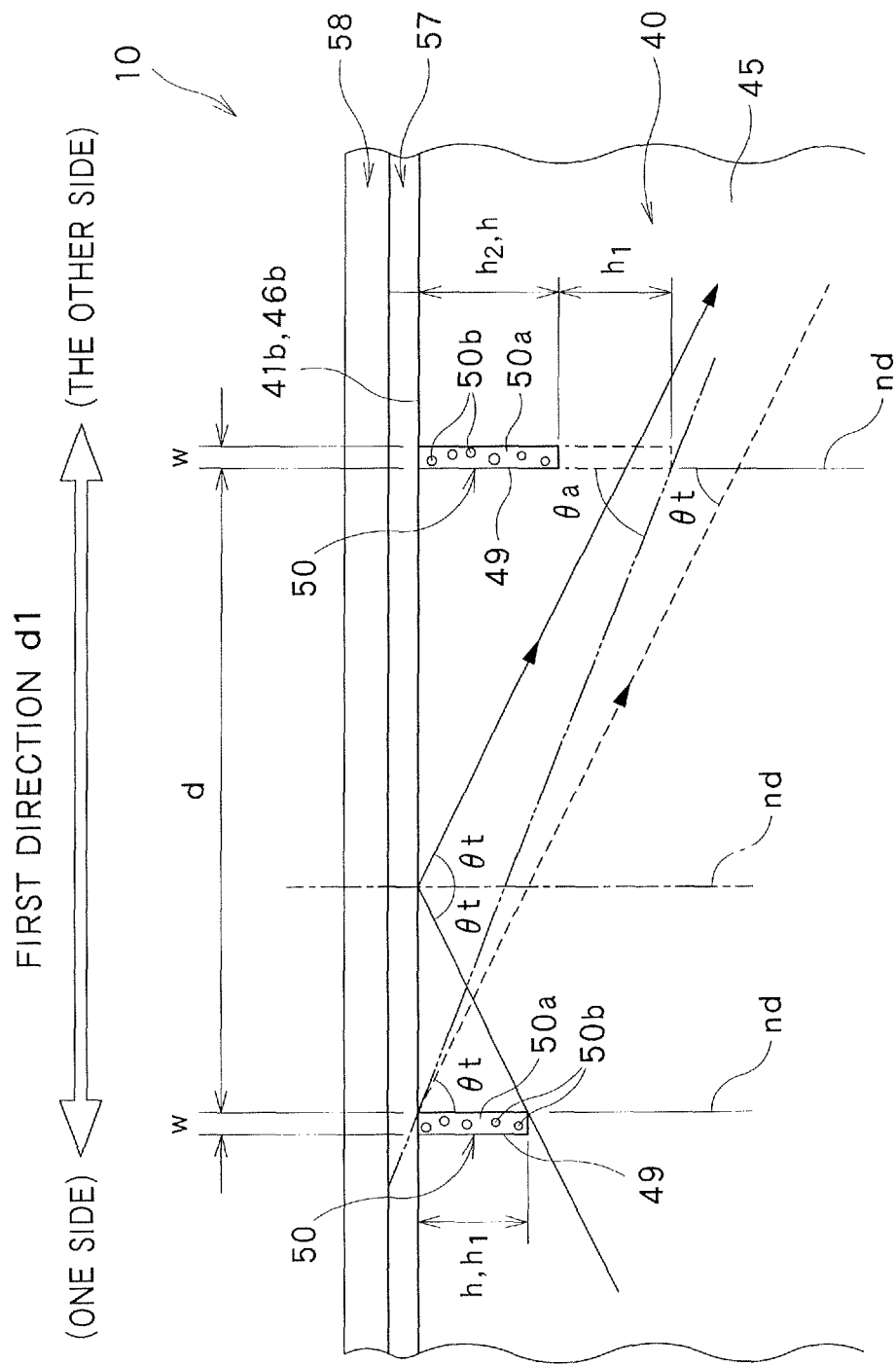
FIG. 4 is a partial enlarged view of the light guide plate of FIG. 1.

FIGS. 1 through 4 are diagrams illustrating the first embodiment of the present invention. Of these, FIGS. 1, 2 and 3 are a vertical sectional view, a partial perspective view and a partial plan view, respectively, of an illumination apparatus 10. FIG. 4 is an enlarged view of a portion of the light guide plate of FIG. 1. FIGS. 1 and 4 each show a cross-section taken along the line A-A of FIG. 3.

The illumination apparatus 10 is a device for planarly emitting light and can be used in a variety of applications, such as interior or exterior lighting, advertising illumination, backlight for a display device, etc. As shown in FIGS. 1 through 3, the illumination apparatus 10 is configured as an illumination apparatus of the so-called edge-light type, and includes a light guide plate 30 and a light source 20 having light emitters 22 disposed lateral to the light guide plate 30. The light guide plate 30 has the shape of a flat plate and has a pair of opposing main surfaces, a first main surface 31$a$ and a second main surface 31$b$. In the illustrated first embodiment, the first main surface 31$a$ forms the light emitting surface 10$a$ of the illumination apparatus 10. As shown by the two-dot chain line in FIG. 1, the illumination apparatus 10 includes a casing (chassis, housing) 11 provided such that it faces the second main surface 31$b$ of the light guide plate 30. The casing 11 covers the second main surface 31$b$ of the light guide plate 30, with the end portions of the casing 11 connecting with the side end surfaces of the light guide plate 30. The interior surface of the casing 11 is formed as a reflective surface made of a high-reflectivity material such as a metal.

In the illustrated embodiment, the flat plate-like light guide plate 30 has a quadrangular shape in a plan view. Thus, the pair of main surfaces, the first main surface 31$a$ and the second main surface 31$b$, each have a quadrangular shape; and four side surfaces are defined between the pair of main surfaces 31$a$, 31$b$ of the light guide plate 30. One of two side surfaces, which oppose each other in a first direction d1 extending along the plate plane of the light guide plate 30, forms a light entrance surface 31$c$. As shown in FIGS. 1 and 2, the light emitters 22 of the light source 20 are provided at positions facing the light entrance surface 31$c$. As shown in FIG. 1, lights L11, L12, L13 that have entered the light guide plate 30 from the light entrance surface 31$c$ travel in the light guide plate 30 approximately in the first direction (light guide direction) d1 toward the opposite surface 31*d* that opposes the light entrance surface 31*c* in the first direction (light guide direction) d1.

Various types of light emitters, including a linear cold-cathode tube such as a fluorescent tube, point-like LEDs (light emitting diodes), an incandescent bulb, etc., can be used for the light source 20. In the first embodiment, the light source 20 is comprised of a large number of point-like light emitters 22, in particular light emitting diodes (LEDs), arranged side by side in a second direction d2 which is the longitudinal direction of the light entrance surface 31*c*. The output of an individual point-like light emitter 22, i.e. turn-on and turn-off of an individual point-like light emitter 22 and/or the luminance of the light emitter 22, can preferably be controlled independently of the other point-like light emitters. In the illustrated embodiment, the first direction d1 and the second direction d2 are perpendicular to each other and are both parallel to the plate plane of the light guide plate 30.

The light guide plate 30 will now be described in greater detail with reference to FIGS. 1 through 4. The light guide plate 30 includes a flat plate-like extracting light guide layer 40 having a pair of opposing main surfaces 41*a*, 41*b*. The extracting light guide layer 40 is disposed such that the first main surface 41*a* lies near the first main surface 31*a* of the light guide plate 30, and the second main surface 41*b* lies near the second main surface 31*b* of the light guide plate 30. Further, in the illustrated embodiment, the light guide plate 30 further includes a first low-refractive index layer 55 and a first cover layer 56, which are stacked in this order on the first main surface 41*a* of the extracting light guide layer 40, and a second low-refractive index layer 57 and a second cover layer 58 which are stacked in this order on the second main surface 41*b* of the extracting light guide layer 40.

The extracting light guide layer 40 comprises a base portion 45 having a pair of opposing main surfaces, a first main surface 46*a* and a second main surface 46*b*, and a number of light diffusing portions 50 provided in the base portion 45. In the illustrated embodiment, a number of spaced-apart grooves 49, arranged in the first direction d1 with a space, are formed in the second main surface 46*b* of the base portion 45. The light diffusing portions 50 are provided in the grooves 49. In conformity with the shape of the light guide plate 30, the base portion 45 is formed as a plate-like member having a quadrangular shape in a plan view. In the illustrated embodiment, the light diffusing portions 50 are disposed in the grooves 49 of the base portion 45 such that the grooves 49 are filled with the light diffusing portions 50. The first main surface 41*a* of the extracting light guide layer 40 is formed by the first main surface 46*a* of the base portion 45, while the second main surface 41*b* of the extracting light guide layer 40 is formed by the second main surface 46*b* of the base portion 45 and the end surfaces of the light diffusing portions 50.

Four side surfaces are formed between the pair of main surfaces 46*a*, 46*b* of the base portion 45. Of the pair of side surfaces 46*c*, 46*d* which oppose each other in the first direction d1, the light entrance-side surface 46*c*, positioned on one side close to the light source 20 in the first direction d1, forms the light entrance surface 31*c* of the light guide plate 30. The opposite-side surface 46*d*, positioned on the other side remote from the light source 20 in the first direction d1, forms the opposite surface 31*d* of the light guide plate 30.

The base portion 45 is provided to guide light from the light source 20, and therefore is made of a material having a high light transmittance, for example, a transparent resin material. On the other hand, the light diffusing portions 50 are provided to diffuse incident light so as to change the traveling direction of light traveling in the extracting light guide layer 40. As described below, after the traveling direction of light is changed by the light diffusing portions 50, the light can exit the extracting light guide layer 40. Thus, the light diffusing portions 50 function as extracting elements for extracting light, which is being guided in the extracting light guide layer 40, from the light guide plate 30.

As shown in FIG. 4, each light diffusing portion 50 may comprise a matrix 50*a* of a resin material, and a diffusing component 50*b* dispersed in the matrix 50*a*. The "diffusing component" herein refers to a component which can exert an optical action, such as refraction or reflection, on light to change the traveling direction of the light. Examples of the diffusing component include a metal compound, a porous material containing a gas, resin beads covered with a metal compound, fine white particles, and air bubbles. The white particles as the diffusing component may be exemplified by acrylic resin particles containing titanium oxide as an additive. The light diffusing portions may contain the acrylic resin particles in an amount of not less than 20 wt % and not more than 30 wt %. The white particles may have an average particle size (average diameter) of not less than 1 μm and not more than 30 μm. The cross-sectional area of each light diffusing portion in a cross-section perpendicular to the normal direction of the light guide plate may be larger than the square of the average particle size of the white particles so that the light diffusing portions can contain the white particles. Further, the width w of each light diffusing portion in the first direction may be not less than the average particle size (average diameter) of the white particles so that the light diffusing portions can contain the white particles.

The illustrated light diffusing portions 50 are formed in the grooves 49 of the base portion 45 and, together with the base portion 45, forms the extracting light guide layer 40 having the shape of a thin quadrangular plate. Thus, the shape and the arrangement of the light diffusing portions 50 correspond to those of the grooves 49. Therefore, the following description solely illustrates the shape and the arrangement of the light diffusing portions 50, which illustration holds true for the shape and the arrangement of the grooves 49.

As shown in FIG. 1, the light diffusing portions 50 are arranged in the first direction d1. Each light diffusing portion 50 extends in a direction not parallel to the arrangement direction, the first direction d1. Particularly in the illustrated embodiment, as shown in FIG. 2, each light diffusing portion 50 extends linearly in a second direction d2 perpendicular to the first direction d1. Each light diffusing portion 50 has a rectangular shape in a cross-section perpendicular to the longitudinal direction, i.e. in a cross-section perpendicular to the second direction d2. The rectangle in the cross-section of each light diffusing portion 50 extends in the normal direction nd to the plate plane of the light guide plate 30.

In the illustrated embodiment, the heights h (see FIG. 4) of the light diffusing portions 50 of the extracting light guide layer 40 in the normal direction nd (see FIG. 4) to the plate plane of the light guide plate 30 are not equal. As described above, the light diffusing portions 50 function as extracting elements to diffuse incident light, thereby causing the light to exit the light guide plate 30. The distribution of the amount of exiting light from the extracting light guide layer 40 can therefore be adjusted by adjusting the volumetric distribution of the light diffusing portions 50 in the extracting light guide layer 40. Thus, the distribution of the amount of exiting light in the light guide direction, the first direction d1, can be controlled by determining the heights h of the light diffusing portions 50 taking into consideration the tendency of the amount of exiting light to be small in a region remote from the light source 20 in the light guide direction d1.

In the illustrated embodiment, from the viewpoint of making uniform the distribution of the amount of exiting light in the first direction d1, the heights h of the light diffusing portions 50 are determined in the following manner: First, the height h of at least one light diffusing portion 50 is higher than the height h of at least one other light diffusing portion 50 located on the one side, of said one light diffusing portion, close to the light source 20 in the first direction d1. This allows an increased amount of light to enter a light diffusing portion(s) 50 in a region, remote from the light source 20 in the light guide direction, where the amount of exiting light is likely to be small, making it possible to ensure a sufficient amount of exiting light in the region remote from the light source 20. Further, in the illustrated embodiment, the height h of a light diffusing portion 50 is not lower than the height h of any other light diffusing portion 50 located on the other, of said light diffusing portion, close to the light source 20 in the first direction d1. In particular, the height h of a light diffusing portion 50 is higher than the height h of any other light diffusing portion 50 located on the other, of said light diffusing portion, close to the light source 20 in the first direction d1. Such a distribution of the heights h of the light diffusing portions 50 can effectively increase the amount of light that enters a light diffusing portion(s) 50 lying in a region remote from the light source 20. This can effectively make uniform the distribution of the amount of exiting light in the light guide direction.

On the other hand, as in the illustrated embodiment, the widths w of the light diffusing portions 50 of the extracting light guide layer 40 in the first direction d1 are preferably equal. As in the illustrated embodiment, the light diffusing portions 50 are preferably arranged with the same pitch in the first direction d1. Further, as in the illustrated embodiment, the distance d between two adjacent light diffusing portions 50 in the first direction d1 is preferably equal among all the light diffusing portions 50 of the extracting light guide layer 40. Such a construction makes it possible to obscure the light diffusing portions 50 which, because of their different light transmittance from that of the base portion 45, are likely to be visible in distinction from the base portion 45.

Specific dimensions of such extracting light guide layer 40 may be set as follows: The thickness of the extracting light guide layer 40 in the normal direction nd to the plate plane of the extracting light guide layer 40 may be set not less than 2 mm and not more than 10 mm. The width w of each light diffusing portion 50 in the first direction d1 may be set not less than 1 μm and not more than 20 μm. The distance d between two adjacent light diffusing portions 50 in the first direction d1 may be set not less than 50 μm and not more than 500 μm. The height h of each light diffusing portion 50 in the normal direction nd to the plate plane of the extracting light guide layer 40 may be set not less than 1 μm and not more than 50 μm. The ratio (h/w) of the height h of each light diffusing portion 50 in the normal direction nd to the plate plane of the extracting light guide layer 40 to the width w of the light diffusing portion 50 in the first direction d1, i.e. the aspect ratio of each light diffusing portion 50, may be set not less than 0.1 and not more than 10, preferably more than 1. When the light diffusing portions 50 have a high aspect ratio, the light diffusing portions 50 can be contained in a certain high volume in the light guide plate 30 with a small projected area of the light diffusing portions 50 in the normal direction nd to the plate plane of the light guide plate 30. Thus, it becomes possible for the light diffusing portions 50 to effectively function as extracting elements while preventing the light diffusing portions 50 from being prominently visible when the light guide plate 30 is viewed in the normal direction nd, as shown in FIG. 3.

In order to enable guiding of light by repetition of total reflection of the light at the pair of main surfaces 46a, 46b of the base portion 45, some two adjacent light diffusing portions 50, lying next to each other in the first direction d1, should satisfy the following relation:

$$\text{Arcsin}(n_L/n) \leq \text{Arctan}(d/(h_1+h_2)) \quad (a)$$

where d is the distance between the two light diffusing portions 50 in the first direction d1, $h_1$ and $h_2$ are the heights of the two light diffusing portions 50 in the normal direction nd of the extracting light guide layer 40, n is the refractive index of the extracting light guide layer 40, and $n_L$ is the refractive index of the layer 57 lying adjacent to the extracting light guide layer 40 from the side of the surface 46b in which the light diffusing portions 50 are provided.

The "Arcsin($n_L$/n)" represents the critical angle $\theta_t$ of total reflection at the interface between the adjacent layer (second low-refractive index layer in the illustrated embodiment) 57 and the base portion 45. If the critical angle $\theta_t$ of total reflection is larger than the angle $\theta_a$ (=Arctan(d/($h_1+h_2$))) shown in FIG. 4, light that has been totally reflected from the second main surface 46b of the base portion 45 at a position between the two light diffusing portions 50 shown in FIG. 4, always enters the light diffusing portion 50 having the height $h_2$. Thus, the light cannot be further guided in the base portion 45. Therefore, it is necessary that the relation (a) be satisfied by some two adjacent light diffusing portions 50 lying next to each other in the first direction d1, preferably by any two adjacent light diffusing portions 50 lying next to each other in the first direction d1.

The extracting light guide layer 40 can be produced, for example, in the following manner: First, the base portion 45 is produced by using a curable material such as epoxy acrylate, having the property of being cured by ionizing radiation such as electron-beam radiation or ultraviolet radiation. Next, the light diffusing portions 50 are produced by using an uncured liquid composition comprising a curable material which, when cured, forms the matrix of the light diffusing portions 50, and the diffusing component of the light diffusing portions 50. A curable material such as urethane acrylate, having the property of being cured by ionizing radiation, can be used as the curable material which, when cured, forms the matrix of the light diffusing portions 50. The composition is supplied onto the previously-formed base portion 45. Thereafter, while filling the composition into the grooves 49 of the base portion 45 by means of a doctor blade, an excess of the composition lying outside the grooves 49 is scraped off with the doctor blade. In order to prevent the diffusing component from being not fully scraped off and remaining on the main surface of the base portion 45, the particle size of the diffusing component is preferably not less than 1 μm, and preferably not more than 50% of the width of the grooves 49. Thereafter, the composition in the grooves 49 is irradiated with ionizing radiation to cure the composition, thereby forming the light diffusing portions 50. The extracting light guide layer 40 comprising the base portion 45 and the light diffusing portions 50 is produced in this manner.

The other layers 55 to 58 of the light guide plate 30 will now be described. The first low-refractive index layer 55 and the second low-refractive index layer 57, disposed adjacent to the main surfaces of the extracting light guide layer 40, are layers each having a lower refractive index than a refractive index of the base portion 45 of the extracting light guide layer 40. The light guide plate 30 of this embodiment is expected to guide light by reflection of the light at the interfaces between the base portion 45 of the extracting light guide layer 40 and the low-refractive index layers 55, 57, in particular by total reflection of the light due to the difference of refractive index at the interfaces. Therefore, the refractive indices of the low-refractive index layers 55, 57 are preferably lower by at least 0.03, more preferably by at least 0.06, than the refractive index of the base portion 45 of the extracting light guide layer 40. In the illustrated embodiment, the low-refractive index layers 55, 57 are formed as bonding layers composed of e.g. an adhesive or binder, and function as layers to attach the cover layers 56, 58 to the extracting light guide layer 40.

On the other hand, the first cover layer 56 and the second cover layer 58 are layers that define the pair of main surfaces 31a, 31b of the light guide plate 30. The cover layers 56, 58 may be formed, for example, as hard coating layers having higher scratch resistance than scratch resistance of the extracting light guide layer 40 and the low-refractive index layers 55, 57. The scratch resistance herein refers to one as evaluated based on the results of a pencil hardness test conducted in accordance with JIS K5600-5-4 (1999).

The operations of the illumination apparatus 10 and the light guide plate 30, having the above-described construction, will now be described.

As shown in FIG. 1, light emitted by the light emitters 22 of the light source 20 enters the extracting light guide layer 40 of the light guide plate 30 via the light entrance surface 31c. Due to the refractive index of the material of the extracting light guide layer 40 being generally in the range of 1.4 to 1.6, the traveling directions of lights L11, L12, L13, which have entered the base portion 45 of the extracting light guide layer 40 from the air space having a refractive index of 1, are not greatly inclined with respect to the normal direction to the light entrance-side surface 46c of the base portion 45 (the light entrance surface 31c of the light guide plate 30), i.e. the first direction d1, as shown in FIG. 1. The lights L11, L12, L13 which have entered the base portion 45 of the extracting light guide layer 40 mostly travel in the light guide direction connecting the light entrance-side surface 46c and the opposite-side surface 46d of the base portion 45, in particular in the first direction d1 in the illustrated embodiment, while repeating reflection, in particular total reflection due to the difference in refractive index between the base portion 45 and the low-refractive index layers 55, 57 adjacent to the base portion 45, at the first main surface 46a and the second main surface 46b of the base portion 45.

The extracting light guide layer 40 is provided with the spaced-apart light diffusing portions 50 arranged in the first direction d1 with a space. The light diffusing portions 50 are formed in the grooves 49 of the base portion 45 and each extend from the second main surface 41b into the extracting light guide layer 40 in the normal direction nd of the extracting light guide layer 40. Therefore, light traveling in the base portion 45 of the extracting light guide layer 40 sometimes enters a light diffusing portion 50. As shown in FIG. 1, when light traveling in the base portion 45 enters a light diffusing portion 50, the traveling direction of the light is changed by the diffusing action of the light diffusing portion 50.

The light that has been diffused by the light diffusing portion 50 mostly is incident on the first main surface 41a of the extracting light guide layer 40 at an angle less than the critical angle of total reflection and exits the extracting light guide layer 40 via the first main surface 41a. The light then passes through the first low-refractive index layer 55 and the first cover layer 56 and, as illuminating light, exits the light guide plate 30 via the first main surface 31a that forms the light emitting surface 10a. Part of the light that has been diffused by the light diffusing portion 50 travels toward the second main surface 31b and exits the light guide plate 30. Such light reflects from the interior surface of the casing 11 and re-enters the light guide plate 30, and then exits the light guide plate 30 as illuminating light or is guided in the light guide plate 30.

The light diffusing portions 50 are arranged in the first direction, the light guide direction. Accordingly, light traveling in the base portion 45 of the extracting light guide layer 40 enters the light diffusing portions 50 at various positions along the light guide direction. Therefore, light traveling in the base portion 45 of the extracting light guide layer 40 exits the light guide plate 30 at various positions along the light guide direction. Especially by adjusting the heights h of the light diffusing portions 50 in the above-described manner, it becomes possible to effectively eliminate the tendency of the amount of exiting light to decrease with distance from the light source in the light guide direction, thereby effectively making uniform the distribution of the amount of exiting light in the light guide direction. In particular, the distribution of the amount of exiting light in the light guide direction can be effectively made uniform by making the height h of at least one light diffusing portion 50 higher than the height h of at least one other light diffusing portion 50 located on the one side, of the one light diffusing portion 50, close to the light source in the first direction d1, more preferably by making the height h of a light diffusing portion 50 not lower than or higher than the height h of any other light diffusing portion 50 located on the one side, of the one light diffusing portion 50, close to the light source in the first direction d1.

Light is thus allowed to exit the light guide plate 30, so that the light emitting surface 10a of the illumination apparatus 10 emits illuminating light.

In a conventional light guide plate, the density of a diffusing material provided on the back surface is changed along the light guide direction so as to control the amount of exiting light. In the conventional light guide plate, therefore, the diffusing material is provided in a pattern on the back surface of the light guide plate. The pattern of the diffusing material is to be visually perceived. This places limitations on the range of use of the conventional illumination apparatus because of problems in terms of appearance, such as deterioration of the design and a loss of high-grade appearance. In addition, the overall distribution of the amount of exiting light cannot be successfully controlled or the amount of exiting light cannot be arbitrarily controlled only by the change in the area of the diffusion/reflection pattern.

On the other hand, the illumination apparatus 10 and the light guide plate 30 according to the first embodiment can solve the problems of the prior art: In the illumination apparatus 10 and the light guide plate 30 according to the first embodiment, the distribution of the amount of exiting light from the light guide plate 30 along the light guide direction (the first direction) d1 is controlled by adjusting the heights h of the light diffusing portions 50, which function as light-extracting elements, of the light guide plate 30. When the light guide plate 30 is viewed in the normal direction nd, the change in the height h between the light diffusing portions 50 is little perceived.

Further, according to the light guide plate 30 of the first embodiment, the width w of each light diffusing portion 50 in the first direction d1 and the distance d between two adjacent light diffusing portions 50 in the first direction d1 need not be utilized for control of the distribution of the amount of exiting light. Therefore, it is possible to equalize, in the light guide plate 30, the width w of each light diffusing portion 50 in the first direction d1 and the distance d between two adjacent light diffusing portions 50 in the first direction d1. In that case, the projected areas of the light diffusing portions 50 in the normal direction nd of the light guide plate 30 are equal as shown in FIG. 3, with substantially no structural difference being perceivable between the light diffusing portions 50.

In addition, the light diffusing portions 50 can be made little perceivable by setting the width w of each light diffusing portion 50 in the first direction d1 sufficiently small. In particular, it is preferred that the light guide plate 30 have a haze value of not less than 0.1% and not more than 10%. The haze value can be measured by a method according to JIS K7136 using a haze meter (product number HM-150, manufactured by Murakami Color Research Laboratory).

Further, the height h can be greatly changed between two adjacent light diffusing portions 50. This makes it possible to control the distribution of the amount of exiting light in the light guide direction with a very high degree of freedom.

The above-described first embodiment can effectively obscure the light diffusing portions 50 which function as extracting elements for extracting light from the light guide plate 30. Thus, it becomes possible to effectively avoid the design of the illumination apparatus 10 from being impaired due to perception of the light-extracting elements. It therefore becomes possible to impart an excellent design to the illumination apparatus 10 and, in addition, to harmonize the illumination apparatus 10 with various installation positions.

According to the first embodiment, the low-refractive index layers 55, 57 are provided adjacent to the extracting light guide layer 40. Between the low-refractive index layers 55, 57 and the base portion 45 of the extracting light guide layer 40 are formed the interfaces at which light traveling in the base portion 45 is reflected. Thus, the interfaces are not exposed. This can effectively prevent damage or attachment of foreign matter to the interfaces at which light traveling in the base portion 45 of the extracting light guide layer 40 is to be reflected, thereby effectively preventing inhibition of the reflection of light for guiding of the light in the light guide plate 30. Further, according to the first embodiment, the surfaces of the light guide plate 30 are formed by the cover layers 56, 58 having higher scratch resistance than scratch resistance of the base portion 45 and the low-refractive index layers 55, 57. This can more effectively prevent damage or attachment of foreign matter to the interfaces at which light traveling in the light guide plate 30 is to be reflected.

Various changes and modifications may be made to the above-described first embodiment. Some exemplary variations will now be described with reference to the relevant drawings. In the following description and relevant drawings, the same reference numerals are used for the same members or elements as used in the above-described embodiment, and a duplicate description thereof will be omitted.

Though in the above-described first embodiment the grooves 49 are formed in the second main surface 46b of the base portion 45, and the light diffusing portions 50 are provided in the second main surface 41b of the extracting light guide layer 40, the present invention is not limited to such a construction. Thus, the grooves 49 may be formed in the first main surface 46a of the base portion 45, and the light diffusing portions 50 may be disposed in the first main surface 41a of the extracting light guide layer 40. Alternatively, the grooves 49 may be formed in both of the first main surface 46a and the second main surface 46b of the base portion 45, and the light diffusing portions 50 may be disposed in both of the first main surface 41a and the second main surface 41b of the extracting light guide layer 40.

In the above-described first embodiment, the light guide plate 30 has the first low-refractive index layer 55, the first cover layer 56, the second low-refractive index layer 57 and the second cover layer 58. In order to promote the extraction of light from the light guide plate 30 having such a construction, it is preferred that at least one of the first low-refractive index layer 55 and the first cover layer 56 contain a diffusing component. In order to promote the extraction of light from the light guide plate 30, it is preferred that at least one of the second low-refractive index layer 57 and the second cover layer 58 contain a diffusing component. Nevertheless, the first low-refractive index layer 55, the first cover layer 56, the second low-refractive index layer 57 and the second cover layer 58 are not essential and at least one of them may be omitted from the light guide plate 30.

Figure 5:
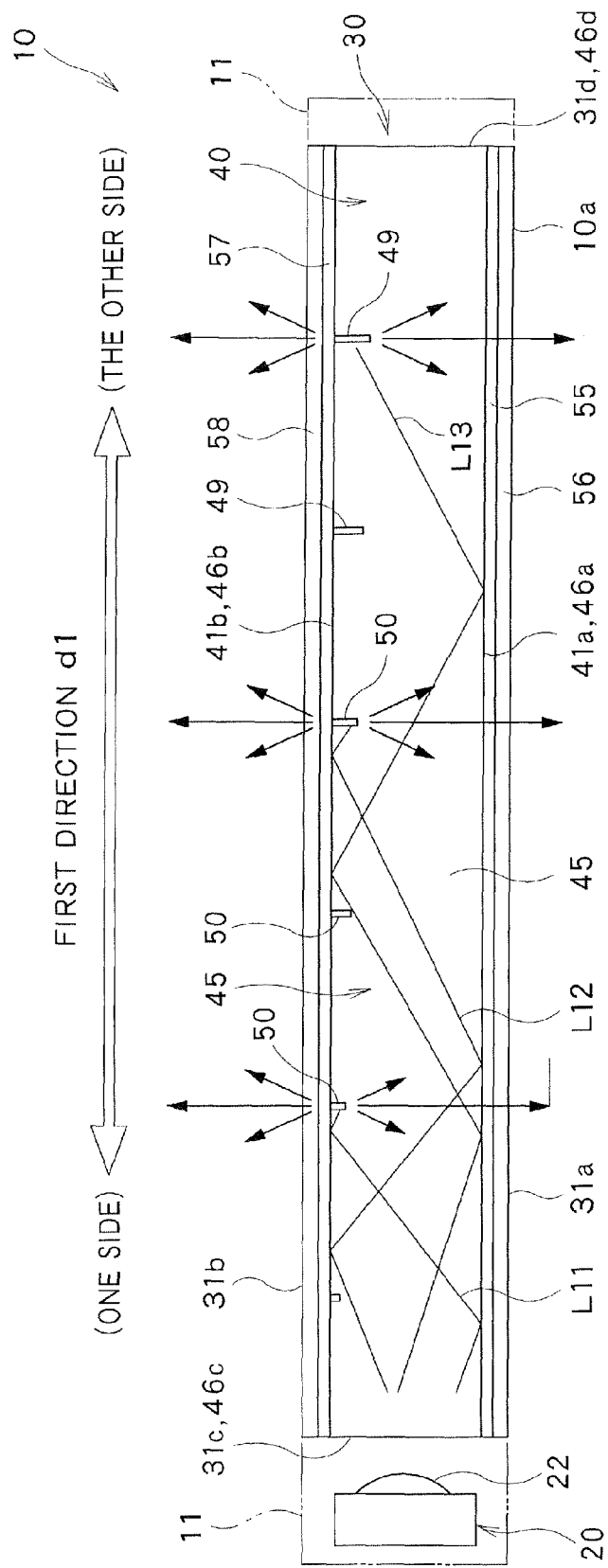
FIG. 5 is a diagram corresponding to FIG. 1, showing a variation of the light guide plate and the illumination apparatus.

Though in the above-described first embodiment the second main surface 31b of the light guide plate 30 is covered with the casing 11, and the light emitting surface 10a is formed only on the first main surface 31a side of the light guide plate 30, the present invention is not limited to such a construction. As shown in FIG. 5, a light emitting surface may be formed on the second main surface 31b side of the light guide plate 30. Thus, the illumination apparatus 10 may have a pair of opposing light emitting surfaces.

In the above-described first embodiment, the first main surface 31a of the light guide plate 30 forms the light emitting surface 10a of the illumination apparatus 10; however, the present invention is not limited to such a construction. A deflecting means for deflecting light that has exited the light guide plate 30 may be provided at a position opposite the first main surface 31a of the light guide plate 30, the deflecting means forming the light emitting surface 10a of the illumination apparatus 10. The deflecting means can be exemplified by a light condensing sheet (light collecting sheet) having a prism surface or lens surface on the light exit side.

The modifications described above can of course be made in an appropriate combination to the above-described first embodiment.

A second embodiment of the present invention will now be described. The below-described light guide plate 30 is configured to extract light only from a certain area of a main surface of the light guide plate. The second embodiment differs from the above-described first embodiment in that the light guide plate 30 further comprises a main light guide layer 70, and a patterned first low-refractive index layer 61 disposed between the main light guide layer 70 and the extracting light guide layer 40. In the following description of the second embodiment, the same reference numerals are used for the same members or elements as used in the above-described first embodiment, and a duplicate description thereof will be omitted as much as possible.

Figure 6:
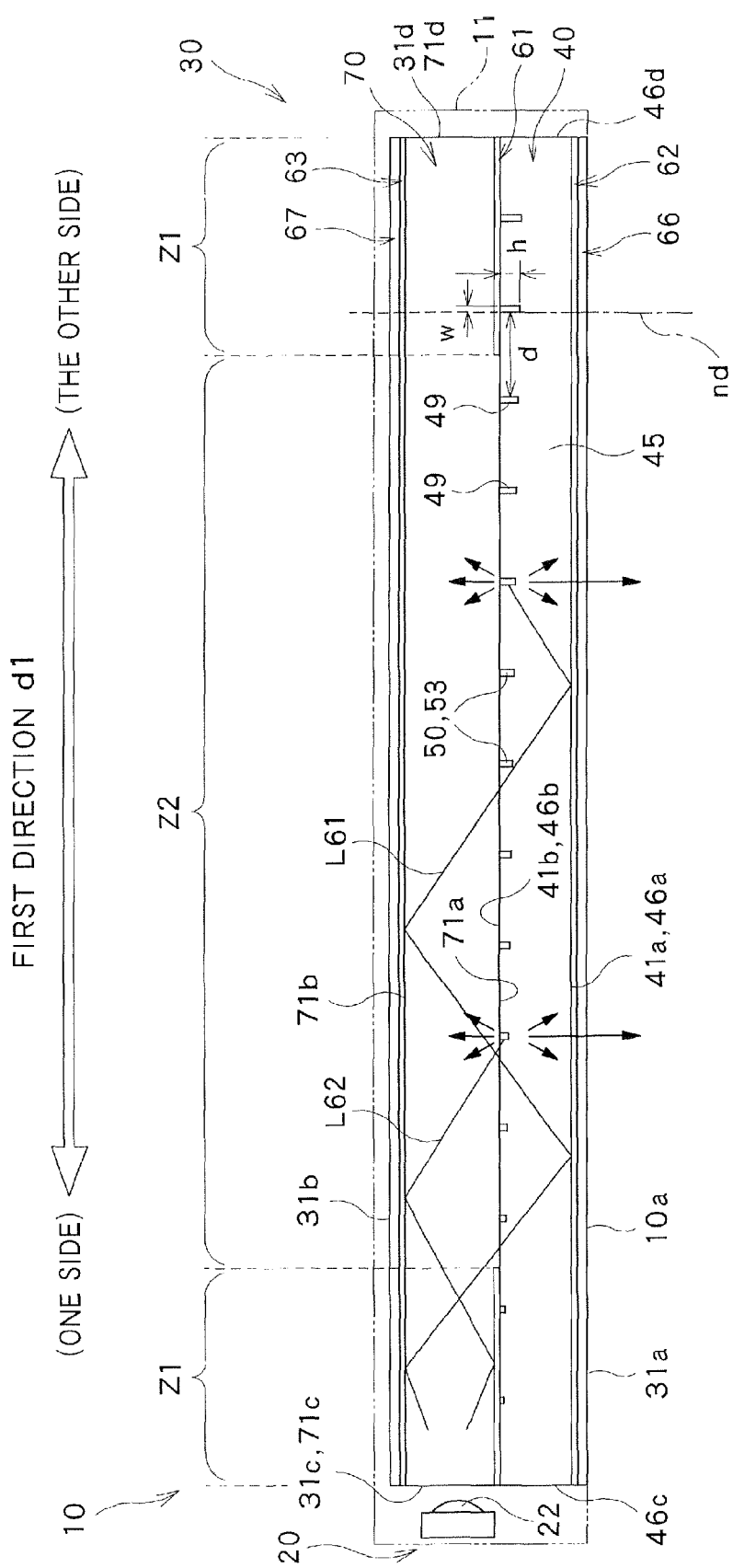
FIG. 6 is a vertical sectional view of an illumination apparatus and a light guide plate, illustrating another embodiment of the present invention.
Figure 7:
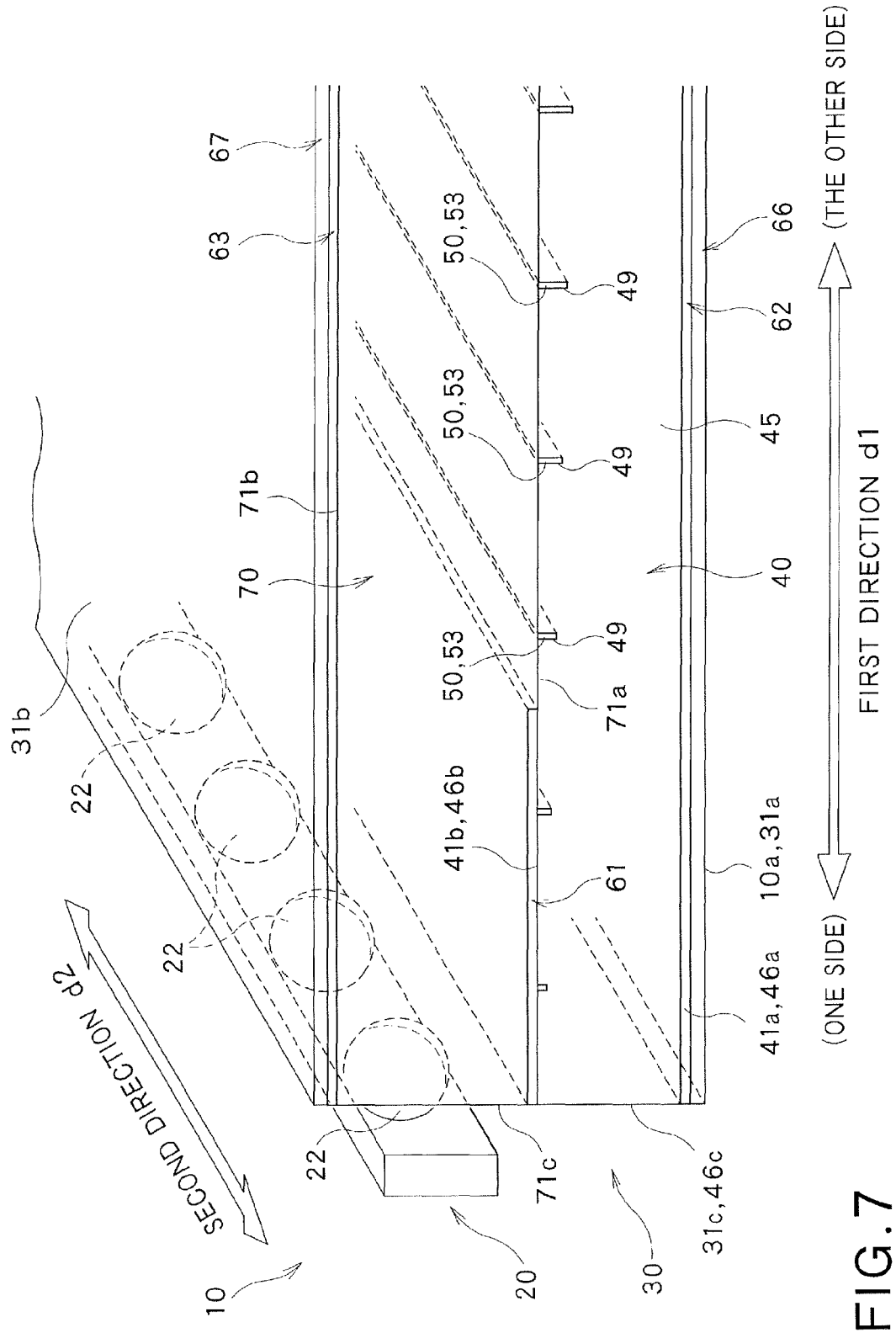
FIG. 7 is a partial perspective view of the illumination apparatus and the light guide plate.
Figure 8:
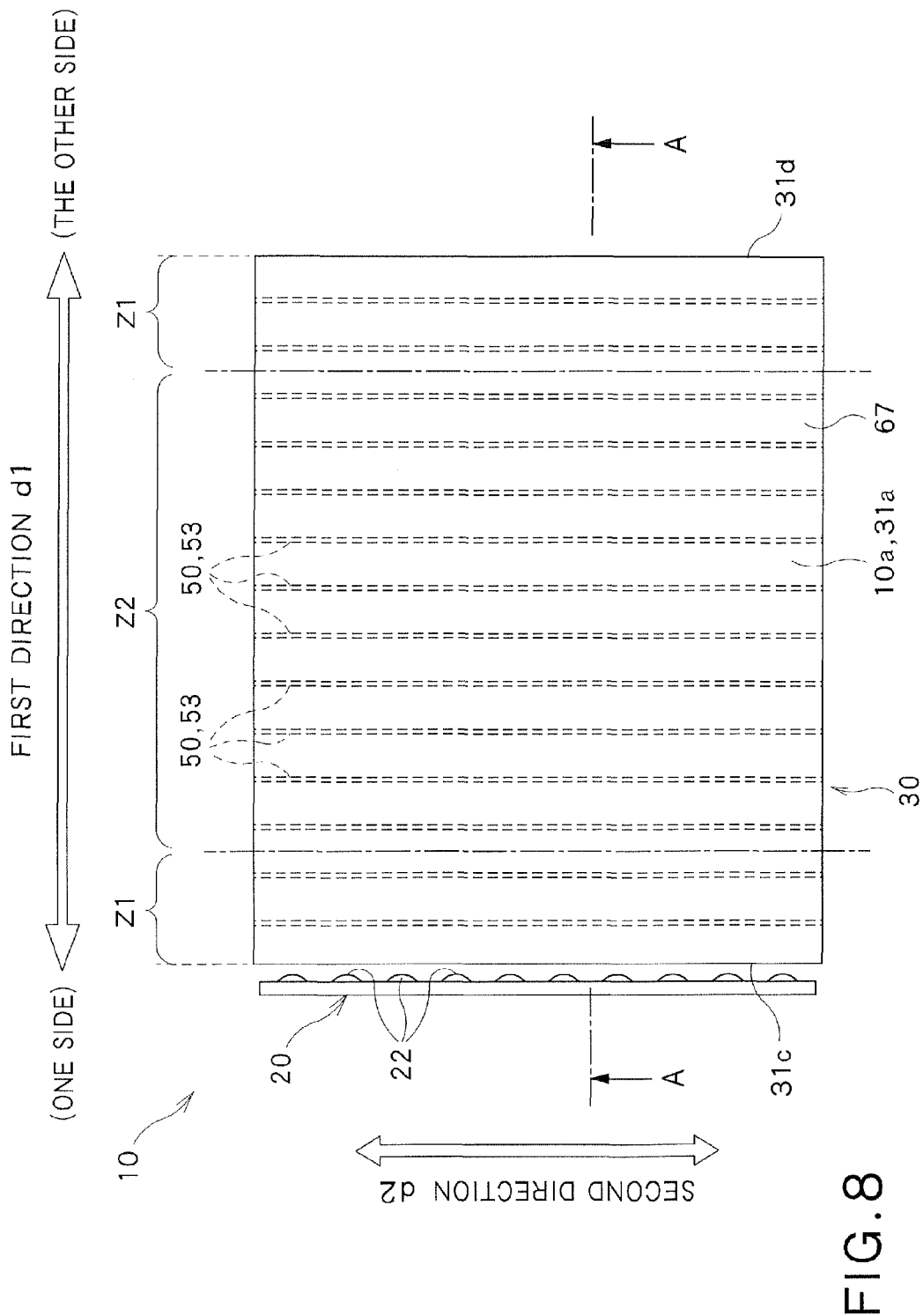
FIG. 8 is a plan view of the illumination apparatus and the light guide plate.

FIGS. 6 through 8 are diagrams illustrating the second embodiment of the present invention, and are a vertical sectional view, a partial perspective view and a plan view, respectively, of an illumination apparatus 10. FIG. 6 shows a cross-section taken along the line A-A of FIG. 8.

The illumination apparatus 10 is a device for planarly emitting light from a certain area of an outermost surface 10a and can be used in a variety of applications, such as interior or exterior lighting, advertising illumination, backlight for a display device, etc. As shown in FIGS. 6 through 8, the illumination apparatus 10 is configured as an illumination apparatus of the so-called edge-light type, and includes the light guide plate 30 and a light source 20 having light emitters 22 disposed lateral to the light guide plate 30. The light guide plate 30 has the shape of a flat plate and has a pair of opposing main surfaces, a first main surface 31a and a second main surface 31b. In the illustrated second embodiment, the first main surface 31a forms the outermost surface 10a of the illumination apparatus 10. As shown by the two-dot chain line in FIG. 6, the illumination apparatus 10 includes a casing 11 provided such that it faces the second main surface 31b of the light guide plate 30. The casing 11 covers the second main surface 31b of the light guide plate 30, with the end portions of the casing 11 connecting with the side end surfaces of the light guide plate 30. The interior of the casing 11 is formed as a reflective surface made of a high-reflectivity material such as a metal.

In the illustrated embodiment, the flat plate-like light guide plate 30 has a quadrangular shape in a plan view. Thus, the pair of main surfaces, the first main surface 31a and the second main surface 31b, each have a quadrangular shape; and four side surfaces are defined between the pair of main surfaces 31a, 31b of the light guide plate 30. One of two side surfaces, which oppose each other in a first direction d1 extending along the plate plane of the light guide plate 30, forms a light entrance surface 31c. As shown in FIGS. 6 and 7, the light emitters 22 of the light source 20 are provided at positions facing the light entrance surface 31c. As shown in FIG. 6, lights L61, L62 that have entered the light guide plate 30 from the light entrance surface 31c travel in the light guide plate 30 approximately in the first direction (light guide direction) d1 toward the opposite surface 31d that opposes the light entrance surface 31c in the first direction (light guide direction) d1.

The light source 20 may have the same construction as in the above-described first embodiment. In the illustrated second embodiment, the light source 20 is comprised of a large number of point-like light emitters 22, in particular light emitting diodes (LEDs), arranged side by side along a second direction d2 which is the longitudinal direction of the light entrance surface 31c. In the illustrated embodiment, the first direction d1 and the second direction d2 are perpendicular to each other and are both parallel to the plate plane of the light guide plate 30.

The light guide plate 30 will now be described in greater detail with reference to FIGS. 6 through 8. The light guide plate 30 includes a flat plate-like main light guide layer 70 having a pair of opposing first main surface 71a and second main surface 71b, a first low-refractive index layer (patterned low-refractive index layer) 61 provided on the first main surface 71a of the main light guide layer 70, and an extracting light guide layer 40 superimposed on the main light guide layer 70 on the side of the first low-refractive index layer 61. As well shown in FIG. 8, the first main surface 71a of the main light guide layer 70 includes a first zone Z1 and a second zone Z2. As described above, the illumination apparatus 10 emits light from a certain area of the outermost surface 10a. The first zone Z1 faces that area of the outermost surface 10a which does not emit light, while the second zone Z2 faces the certain area which emits light. The first low-refractive index layer 61 is provided only on the first zone Z1 of the first main surface 71a, and is not provided on the second zone Z2. Further, in the illustrated embodiment, the light guide plate 30 further includes a second low-refractive index layer (front-side low-refractive index layer) 62 and a first cover layer (front-side cover layer) 66, which are stacked in this order on the opposite side of the extracting light guide layer 40 from the main light guide layer 70, and a third low-refractive index layer (back-side low-refractive index layer) 63 and a second cover layer (back-side cover layer) 67, which are stacked in this order on the opposite side of the main light guide layer 70 from the extracting light guide layer 40, as shown in FIGS. 6 and 7. The following are a description of the respective layers.

The main light guide layer 70 will be described first. The main light guide layer 70 is disposed such that the first main surface 71a lies near the first main surface 31a of the light guide plate 30, and the second main surface 71b lies near the second main surface 31b of the light guide plate 30. In conformity with the shape of the light guide plate 30, the main light guide layer 70 is formed as a plate-like member having a quadrangular shape in a plan view. Four side surfaces are formed between the pair of main surfaces 71a, 71b of the main light guide layer 70. Of the pair of side surfaces 71c, 71d which oppose each other in the first direction d1, the light entrance-side surface 71c, positioned on the one side close to the light source 20 in the first direction d1, forms the light entrance surface 31c of the light guide plate 30. The opposite-side surface 71d, positioned on the other side remote from the light source 20 in the first direction d1, forms the opposite surface 31d of the light guide plate 30. Thus, as shown in FIG. 7, the light emitters 22 of the light source 20 are disposed opposite the side surface of the main light guide layer 70. The main light guide layer 70 is provided to guide light from the light source 20, and therefore is made of a material having a high light transmittance, for example, a transparent resin material.

As shown in FIG. 8, the first zone Z1 and the second zone Z2 of the first main surface 71a of the main light guide layer 70 are arranged in the first direction d1. In the illustrated embodiment, the second zone Z2 is disposed centrally in the first direction d1, and the first zone z1 is disposed on both sides of the second zone Z2 in the first direction d1. The ranges of the first zone Z1 and the second zone Z2 are determined by a particular area, which is intended to be illuminated, of the outermost surface 10a of the illumination apparatus 10. Thus, the first zone Z1 and the second zone Z2 of the first main surface 71a of the main light guide layer 70 may be arranged in various manners. For example, the first zone Z1 and the second zone Z2 may be arranged in the second direction d2, or both in the first direction d1 and in the second direction d2. Further, the first zone Z1 and the second zone Z2 may be arranged in a particular pattern in the first and second directions.

The first low-refractive index layer 61 will now be described. The first low-refractive index layer 61 is disposed adjacent to the main light guide layer 70 in the first zone Z1, and forms an interface between it and the main light guide layer 70. The first low-refractive index layer 61 is a layer having a lower refractive index than a refractive index of the main light guide layer 70. The main light guide layer 70 of the light guide plate 30 of this embodiment is expected to guide light by reflection of the light at the interface between the main light guide layer 70 and the first low-refractive index layer 61, in particular by total reflection of the light due to the difference of refractive index at the interface. Therefore, the refractive index of the first low-refractive index layer 61 is preferably lower by at least 0.03, more preferably by at least 0.06, than the refractive index of the main light guide layer 70. The first low-refractive index layer 61 may be a bonding layer (e.g. an adhesive layer or a binder layer) for bonding the main light guide layer 70 and the extracting light guide layer 40 together.

The extracting light guide layer 40 will now be described. The extracting light guide layer 40 has a number of extracting elements 53 arranged in the first direction d1. The extracting elements 53 change the traveling direction of light from the main light guide layer 70. As described below, after the traveling direction of light is changed by an extracting element 53, the light can exit the main light guide layer 70. Thus, the extracting elements 53 function as elements to extract light, which is being guided in the light guide plate 30, from the light guide plate 30. The extracting elements 53 are not only disposed in a region facing the second zone Z2 corresponding to the luminous area, but also disposed in a region facing the first zone Z1b corresponding to the non-luminous area. The exemplary extracting light guide layer 40 shown in FIGS. 6 through 8 will now be described in detail. The extracting light guide layer 40 of the second embodiment, shown in FIGS. 6 through 8, may have the same construction as the above-described extracting light guide layer of the first embodiment.

In the embodiment illustrated in FIGS. 6 through 8, the extracting light guide layer 40 has the shape of a flat plate having a pair of opposing main surfaces 41a, 41b. The extracting light guide layer 40 is disposed such that the first main surface 41a lies near the first main surface 31a of the light guide plate 30, and the second main surface 41b lies near the second main surface 31b of the light guide plate 30. In the illustrated embodiment, the extracting light guide layer 40 is located closer to the first main surface 31a of the light guide plate 30, constituting the outermost surface 10a of the illumination apparatus 10, than the main light guide layer 70.

The extracting light guide layer 40 comprises a base portion 45 having a pair of opposing main surfaces, a first main surface 46a and a second main surface 46b, and a number of light diffusing portions 50 provided in the base portion 45. In the illustrated embodiment, a number of spaced-apart grooves 49, arranged in the first direction, are formed in the second main surface 41b of the base portion 45. The light diffusing portions 50 are provided in the grooves 49. In conformity with the shape of the light guide plate 30, the base portion 45 is formed as a plate-like member having a quadrangular shape in a plan view. In the illustrated embodiment, the light diffusing portions 50 are disposed in the grooves 49 of the base portion 45 such that the grooves 49 are filled with the light diffusing portions 50. The first main surface 41a of the extracting light guide layer 40 is formed by the first main surface 46a of the base portion 45, while the second main surface 41b of the extracting light guide layer 40 is formed by the second main surface 46b of the base portion 45 and the end surfaces of the light diffusing portions 50.

Four side surfaces are formed between the pair of main surfaces 46a, 46b of the base portion 45. Of the pair of side surfaces 46c, 46d which oppose each other in the first direction d1, the light entrance-side surface 46c, positioned on the one side close to the light source 20 in the first direction d1, forms part of the light entrance surface 31c of the light guide plate 30. The opposite-side surface 46d, positioned on the other side remote from the light source 20 in the first direction d1, forms part of the opposite surface 31d of the light guide plate 30. The light emitters 22 of the light source 20 are not disposed at positions facing the light entrance-side surface 46c of the base portion 45.

The base portion 45 guides light from the light source 20 at least in a region facing the second zone Z2, as will be described later. Therefore, the base portion 45 is made of a material having a high light transmittance, for example, a transparent resin material. On the other hand, the light diffusing portions 50 are provided to diffuse incident light. In the embodiment illustrated in FIGS. 6 through 8, the light diffusing portions 50 form extracting elements 53 for changing the traveling direction of light traveling in the extracting light guide layer 40. Accordingly, the light diffusing portions 50 are provided in a region facing both the first zone Z1 and the second zone Z2. As in the above-described first embodiment, each light diffusing portion 50 may comprise a matrix 50a (see FIG. 4) of a resin material, and a diffusing component 50b (see FIG. 4) dispersed in the matrix 50a.

The "diffusing component" herein refers to a component which can exert an optical action, such as refraction or reflection, on light to change the traveling direction of the light. Examples of the diffusing component include a metal compound, a porous material containing a gas, resin beads covered with a metal compound, white fine particles, and air bubbles. The white particles as the diffusing component may be exemplified by acrylic resin particles containing titanium oxide as an additive. The light diffusing portions may contain the acrylic resin particles in an amount of not less than 20 wt % and not more than 30 wt %. The white particles may have an average particle size (average diameter) of not less than 1 μm and not more than 30 μm. The cross-sectional area of each light diffusing portion in a cross-section perpendicular to the normal direction of the light guide plate may be larger than the square of the average particle size of the white particles so that the light diffusing portions can contain the white particles. Further, the width w of each light diffusing portion in the first direction may be not less than the average particle size (average diameter) of the white particles so that the light diffusing portions can contain the white particles.

The illustrated light diffusing portions 50 are formed in the grooves 49 of the base portion 45 and, together with the base portion 45, forms the extracting light guide layer 40 having the shape of a quadrangular thin plate. Thus, the shape and the arrangement of the light diffusing portions 50 correspond to those of the grooves 49. Therefore, the following description solely illustrates the shape and the arrangement of the light diffusing portions 50, which illustration holds true for the shape and the arrangement of the grooves 49.

As shown in FIG. 6, the light diffusing portions 50 are arranged in the first direction d1. Each light diffusing portion 50 extends in a direction not parallel to the arrangement direction, the first direction d1. Particularly in the illustrated embodiment, as shown in FIG. 7, each light diffusing portion 50 extends linearly in a second direction d2 perpendicular to the first direction d1. Each light diffusing portion 50 has a rectangular shape in a cross-section perpendicular to the longitudinal direction, i.e. in a cross-section perpendicular to the second direction d2. The rectangle in the cross-section of each light diffusing portion 50 extends in the normal direction nd to the plate plane of the light guide plate 30.

In the illustrated embodiment, the heights h (see FIG. 6) of the light diffusing portions 50 in the normal direction nd to the plate plane of the light guide plate 30 are not equal among the light diffusing portions 50 contained in the extracting light guide layer 40. As described above, the light diffusing portions 50 function as extracting elements to diffuse incident light, thereby causing the light to exit the light guide plate 30. The distribution of the amount of exiting light from the extracting light guide layer 40 can therefore be adjusted by adjusting the volumetric distribution of the light diffusing portions 50 in the extracting light guide layer 40. Thus, the distribution of the amount of exiting light in the light guide direction, the first direction d1, can be controlled by determining the heights h of the light diffusing portions 50 taking into consideration the fact that the amount of exiting light tends to be small in a region remote from the light source 20 in the light guide direction d1.

In the illustrated embodiment, from the viewpoint of making uniform the distribution of the amount of exiting light in the first direction d1, the heights h of the light diffusing portions 50 are determined in the following manner: First, the height h of at least one light diffusing portion 50 is higher than the height h of at least one other light diffusing portion 50 located on the one side, of said one light diffusing portion 50, close to the light source 20 in the first direction d1. This allows an increased amount of light to enter a light diffusing portion(s) 50 in a region, remote from the light source 20 in the light guide direction, where the amount of exiting light is likely to be small, making it possible to ensure a sufficient amount of exiting light in the region remote from the light source 20. Further, in the illustrated embodiment, the height h of a light diffusing portion 50 is not lower than the height h of any other light diffusing portion 50 located on the one side, of said light diffusing portion 50, close to the light source 20 in the first direction d1. In particular, the height h of a light diffusing portion 50 is higher than the height h of any other light diffusing portion 50 located on the one side, of said light diffusing portion 50, close to the light source 20 in the first direction d1. Such a distribution of the heights h of the light diffusing portions 50 can effectively increase the amount of light that enters a light diffusing portion(s) 50 lying in a region remote from the light source 20. This can effectively make uniform the distribution of the amount of exiting light in the light guide direction.

On the other hand, as in the illustrated embodiment, the widths w of the light diffusing portions 50 in the first direction d1 are preferably equal among the light diffusing portions 50 contained in the extracting light guide layer 40. As in the illustrated embodiment, the light diffusing portions 50 are preferably arranged with the same pitch in the first direction d1. Further, as in the illustrated embodiment, the distance d between two adjacent light diffusing portions 50 in the first direction d1 is preferably equal among the light diffusing portions 50 contained in the extracting light guide layer 40. Such a construction makes it possible to obscure the light diffusing portions 50 which, because of their different transmittance from that of the base portion 45, are likely to be visible in distinction from the base portion 45.

Specific dimensions of the extracting light guide layer 40 may be set in the same manner as in the above-described first embodiment.

The extracting light guide layer 40 having the above construction can be produced by the same method as described above with reference to the production of the extracting light guide layer 40 according to the first embodiment.

The other layers 62, 63, 66, 67 of the light guide plate 30 will now be described. The second low-refractive index layer 62 and the third low-refractive index layer 63, disposed adjacent to the first main surface 41a of the extracting light guide layer 40 and the second main surface 71b of the main light guide layer 70, respectively, are layers each having a lower refractive index than a refractive index of the base portion 45 of the extracting light guide layer 40 or the main light guide layer 70. The light guide plate 30 of this embodiment is expected to guide light by reflection of the light at the interface between the base portion 45 of the extracting light guide layer 40 and the second low-refractive index layer 62 and at the interface between the main light guide layer 70 and the third low-refractive index layer 63, in particular by total reflection of the light due to the difference of refractive index at the interfaces. Therefore, the refractive index of the second low-refractive index layer 62 is preferably lower by at least 0.03, more preferably by at least 0.06, than the refractive index of the base portion 45 of the extracting light guide layer 40. The refractive index of the third low-refractive index layer 63 is preferably lower by at least 0.03, more preferably by at least 0.06, than the refractive index of the main light guide layer 70. In the illustrated embodiment, the second and third low-refractive index layers 62, 63 are formed as bonding layers composed of e.g. an adhesive or binder, and function as layers to attach the cover layers 66, 67 to the extracting light guide layer 40 and the main light guide layer 70.

On the other hand, the first cover layer 66 and the second cover layer 67 are layers that define the pair of main surfaces 31a, 31b of the light guide plate 30. The cover layers 66, 67 may be formed, for example, as hard coating layers having higher scratch resistance than scratch resistance of the extracting light guide layer 40, the main light guide layer 70 and the low-refractive index layers 61, 62, 63. The scratch resistance herein refers to one as evaluated based on the results of a pencil hardness test conducted in accordance with JIS K5600-5-4 (1999).

The operations of the illumination apparatus 10 and the light guide plate 30, having the above-described construction, will now be described.

As shown in FIG. 6, light emitted by the light emitters 22 of the light source 20 enters the main light guide layer 70 of the light guide plate 30 via the light entrance surface 31c. Due to the refractive index of the material of the main light guide layer 70 being generally in the range of 1.4 to 1.6, the traveling directions of lights L61, L62, which have entered the main light guide layer 70 from the air space having a refractive index of 1, are not greatly inclined with respect to the normal direction to the light entrance-side surface 71c of the main light guide layer 70 (the light entrance surface 31c of the light guide plate 30), i.e. the first direction d1, as shown in FIG. 6. The lights L61, L62 which have entered the main light guide layer 70 mostly travel in the light guide direction connecting the light entrance-side surface 71c and the opposite-side surface 71d of the main light guide layer 70, in particular in the first direction d1 in the illustrated embodiment, while repeating reflection, in particular total reflection due to the difference in refractive index between the main light guide layer 70 and the first and third low-refractive index layers 61, 63 adjacent to the main light guide layer 70, at the first main surface 71a and the second main surface 71b of the main light guide layer 70. Thus, light from the light source 20 travels in the main light guide layer 70 of the light guide plate 30 and is not caused to be extracted from the light guide plate 30 in the region facing the first zone Z1 where the first low-refractive index layer 61 is provided.

The lights L61, L62 which have reached the region facing the second zone Z2 then mostly repeat reflection, in particular total reflection due to the difference in refractive index between the main light guide layer 70 and the third low-refractive index layer 63 adjacent to the main light guide layer 70 and due to the difference in refractive index between the base portion 45 of the extracting light guide layer 40 and the second low-refractive index layer 62, at the second main surface 71b of the main light guide layer 70 and the first main surface 46a of the base portion 45 of the extracting light guide layer 40. Owing to the reflection, light continues to be guided in the light guide plate 30 in the light guide direction connecting the light entrance surface 31c and the opposite surface 31d of the light guide plate 30, in particular in the first direction d1 in the illustrated embodiment.

The extracting light guide layer 40 is provided with the spaced-apart light diffusing portions 50 arranged in the first direction d1. The light diffusing portions 50 are formed in the grooves 49 of the base portion 45 and each extend from the second main surface 41b into the extracting light guide layer 40 in the normal direction nd of the extracting light guide layer 40. Therefore, light traveling in the base portion 45 of the extracting light guide layer 40 sometimes enters a light diffusing portion 50. As shown in FIG. 6, when light traveling in the base portion 45 enters a light diffusing portion 50, the traveling direction of the light is changed by the diffusing action of the light diffusing portion 50.

The light that has been diffused by the light diffusing portion 50 mostly is incident on the first main surface 41a of the extracting light guide layer 40 at an angle less than the critical angle of total reflection and exits the extracting light guide layer 40 via the first main surface 41a. The light then passes through the second low-refractive index layer 62 and the first cover layer 66 and, as illuminating light, exits the light guide plate 30 via the first main surface 31a that forms the outermost surface 10a of the illumination apparatus 10. Part of the light that has been diffused by the light diffusing portion 50 travels toward the second main surface 31b and exits the light guide plate 30. Such light reflects from the interior surface of the casing 11 and re-enters the light guide plate 30, and then exits the light guide plate 30 as illuminating light or is guided in the light guide plate 30.

The light diffusing portions 50 are arranged in the first direction, the light guide direction. Accordingly, light traveling in the region, facing the second zone Z2, of the light guide plate 30 can enter the light diffusing portions 50 at various positions along the light guide direction. Therefore, light traveling in the base portion 45 of the extracting light guide layer 40 exits the light guide plate 30 at various positions along the light guide direction. Especially by adjusting the heights of the light diffusing portions 50 in the above-described manner, it becomes possible to effectively eliminate the tendency of the amount of exiting light to decrease with distance from the light source 20 in the light guide direction, thereby effectively making uniform the distribution of the amount of exiting light in the light guide direction. In particular, the distribution of the amount of exiting light in the light guide direction can be effectively made uniform by making the height h of at least one light diffusing portion 50 higher than the height h of at least one other light diffusing portion 50 located on the one side, of said one light diffusing portion 50, close to the light source in the first direction d1, more preferably by making the height h of a light diffusing portion 50 not lower than or higher than the height h of any other light diffusing portion 50 located on the one side, of said light diffusing portion 50, close to the light source in the first direction d1.

Light is thus allowed to exit the light guide plate 30 from the region facing the second zone Z2 where the first low-refractive index layer 61 is not provided, so that the area, facing the second zone Z2, of the outermost surface 10a of the illumination apparatus 10 emits illuminating light. On the other hand, light does not enter the extracting light guide layer 40, having the light diffusing portions 50 as the light extracting elements 53, in the region of the light guide plate 30, facing the first zone Z1 where the first low-refractive index layer 61 is provided. Therefore, the area, facing the first zone Z1, of the outermost surface 10a of the illumination apparatus 10 will not be luminous with sufficient brightness.

As described above, in a conventional light guide plate, the density of a diffusing material provided in the back surface is changed along the light guide direction so as to control the amount of exiting light. In the conventional light guide plate, therefore, the diffusing material is provided in a pattern in the back surface of the light guide plate. There occurs visible appearance of the pattern in an illumination apparatus using the light guide plate. This places limitations on the range of use of the conventional illumination apparatus because of problems in terms of appearance, such as deterioration of the design and a loss of high-grade appearance. In addition, the overall distribution of the amount of exiting light cannot be successfully controlled or the amount of exiting light cannot be arbitrarily controlled only by the change in the area of the diffusion/reflection pattern.

On the other hand, the illumination apparatus 10 and the light guide plate 30 according to the second embodiment can solve the problems of the prior art: In the illumination apparatus 10 and the light guide plate 30 according to the second embodiment, the distribution of the amount of exiting light from the light guide plate 30 along the light guide direction (the first direction) d1 is controlled by adjusting the heights h of the light diffusing portions 50, which form the light-extracting elements 53, of the light guide plate 30. When the light guide plate 30 is viewed in the normal direction nd, the change in the height h between the light diffusing portions 50 as the extracting elements 53 is little perceived.

Further, according to the light guide plate 30 of the second embodiment, the width w of each light diffusing portion 50 as an extracting element 53 in the first direction d1 and the distance d between two adjacent light diffusing portions 50 in the first direction d1 need not be utilized for control of the distribution of the amount of exiting light. Therefore, it is possible to equalize, in the light guide plate 30, the width w of each light diffusing portion 50 as an extracting element 53 in the first direction d1 and the distance d between two adjacent light diffusing portions 50 in the first direction d1. In that case, the projected areas of the light diffusing portions 50 as the extracting elements 53 in the normal direction nd of the light guide plate 30 are equal as shown in FIG. 8, with substantially no structural difference being perceivable between the light diffusing portions 50.

Particularly in the second embodiment, the extracting elements 53 are disposed not only in the second zone Z2 facing the luminous area of the outermost surface 10a but also in the first zone Z1 facing the non-luminous area of the outermost surface 10a. When the outermost surface 10a is viewed, the extracting elements 53 will be more prominently perceived if the extracting elements 53 are absent in the first zone Z1. Thus, the provision of the extracting elements 53 also in the zone Z1 can effectively obscure the extracting elements 53 as a whole.

In addition, the light diffusing portions 50 as the extracting elements 53 can be made little perceivable by setting the width w of each light diffusing portion 50 in the first direction d1 sufficiently small. In particular, it is preferred that the light guide plate 30 have a haze value of not less than 0.1% and not more than 10%. The haze value can be measured by a method according to JIS K7136 using a haze meter (product number HM-150, manufactured by Murakami Color Research Laboratory).

Further, the height h can be greatly changed between two adjacent light diffusing portions 50 as extracting elements 53. This makes it possible to control the distribution of the amount of exiting light in the light guide direction with a very high degree of freedom.

The above-described second embodiment can effectively obscure the extracting elements 53 for extracting light from the light guide plate 30. Thus, it becomes possible to effectively avoid the design of the illumination apparatus 10 from being impaired due to perception of the light-extracting elements 53. It therefore becomes possible to impart an excellent design to the illumination apparatus 10 and, in addition, to harmonize the illumination apparatus 10 with various installation positions.

According to the second embodiment, the second and third low-refractive index layers 62, 63 are provided such that they sandwich the extracting light guide layer 40 and the main light guide layer 70. Interfaces at which light traveling in the base portion 45 of the extracting light guide layer 40 and in the main light guide layer 70 is reflected are formed between the base portion 45 and the second low-refractive index layers 62 and between the main light guide layer 70 and the third low-refractive index layers 63. Thus, the interfaces are not exposed. This can effectively prevent damage or attachment of foreign matter to the interfaces at which light traveling in the base portion 45 of the extracting light guide layer 40 and in the main light guide layer 70 is to be reflected, thereby effectively preventing inhibition of the reflection of light for guiding of the light in the light guide plate 30. Further, according to the second embodiment, the surfaces of the light guide plate 30 are formed by the cover layers 66, 67 having higher scratch resistance than the base portion 45, the main light guide layer 70 and the low-refractive index layers 62, 63. This can more effectively prevent damage or attachment of foreign matter to the interfaces at which light traveling in the light guide plate 30 is to be reflected.

Various changes and modifications may be made to the above-described second embodiment. Some exemplary variations will now be described with reference to the relevant drawing. In the following description and relevant drawings, the same reference numerals are used for the same members or elements as used in the above-described embodiments, and a duplicate description thereof will be omitted.

Figure 9:
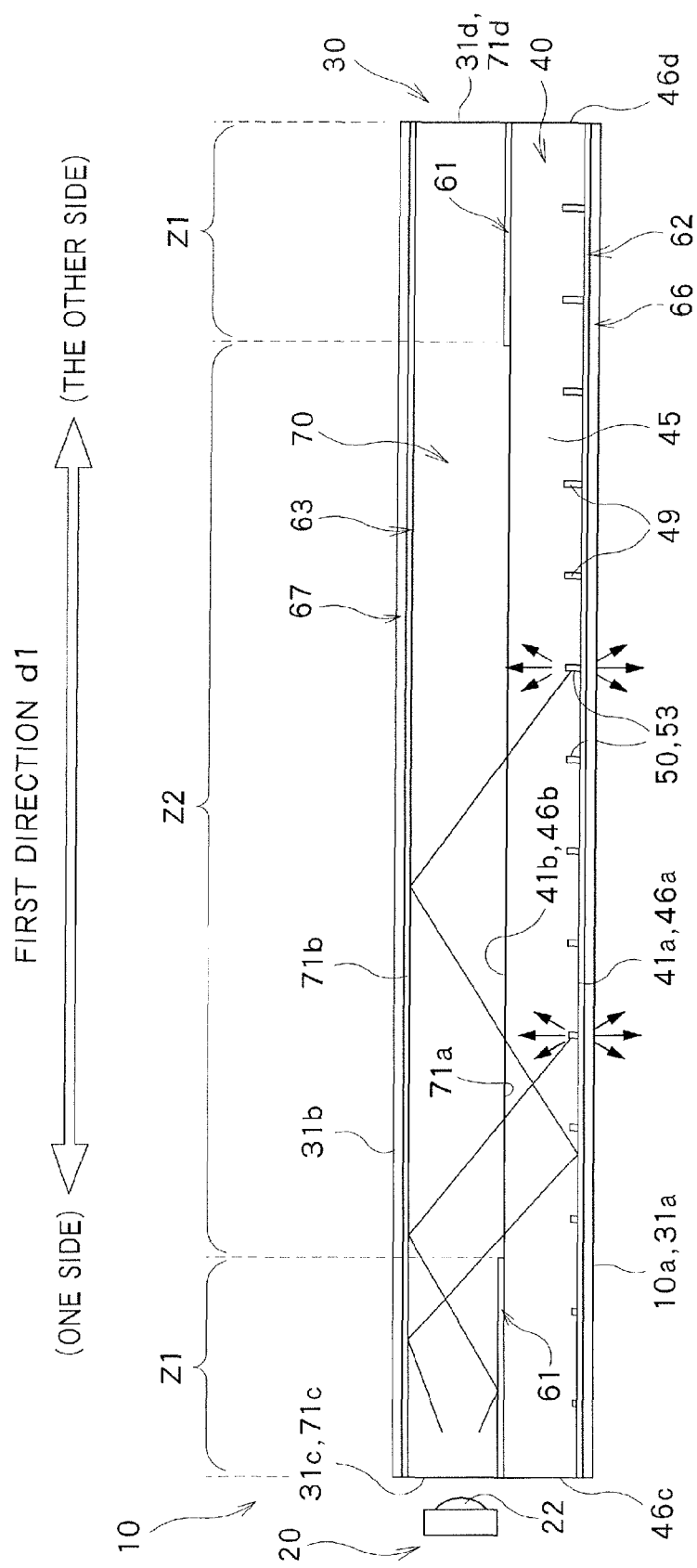
FIG. 9 is a diagram corresponding to FIG. 6, showing a variation of the light guide plate.

Though in the above-described second embodiment the grooves 49 are formed in the second main surface 46b of the base portion 45, and the light diffusing portions 50 are provided in the second main surface 41b of the extracting light guide layer 40, the present invention is not limited to such a construction. Thus, as shown in FIG. 9, the grooves 49 may be formed in the first main surface 46a of the base portion 45, and the light diffusing portions 50 may be disposed in the first main surface 41a of the extracting light guide layer 40. Alternatively, the grooves 49 may be formed in both of the first main surface 46a and the second main surface 46b of the base portion 45, and the light diffusing portions 50 may be disposed in both of the first main surface 41a and the second main surface 41b of the extracting light guide layer 40.

In the above-described second embodiment, the light guide plate 30 has the second low-refractive index layer 62, the first cover layer 66, the third low-refractive index layer 63 and the second cover layer 67. In order to promote the extraction of light from the light guide plate 30 having such a construction, it is preferred that at least one of the second low-refractive index layer 62 and the first cover layer 66 contain a diffusing component. In order to promote the extraction of light from the light guide plate 30, it is preferred that at least one of the third low-refractive index layer 63 and the second cover layer 67 contain a diffusing component. Nevertheless, the second low-refractive index layer 62, the first cover layer 66, the third low-refractive index layer 63 and the second cover layer 67 are not essential and at least one of them may be omitted from the light guide plate 30.

Figure 10:
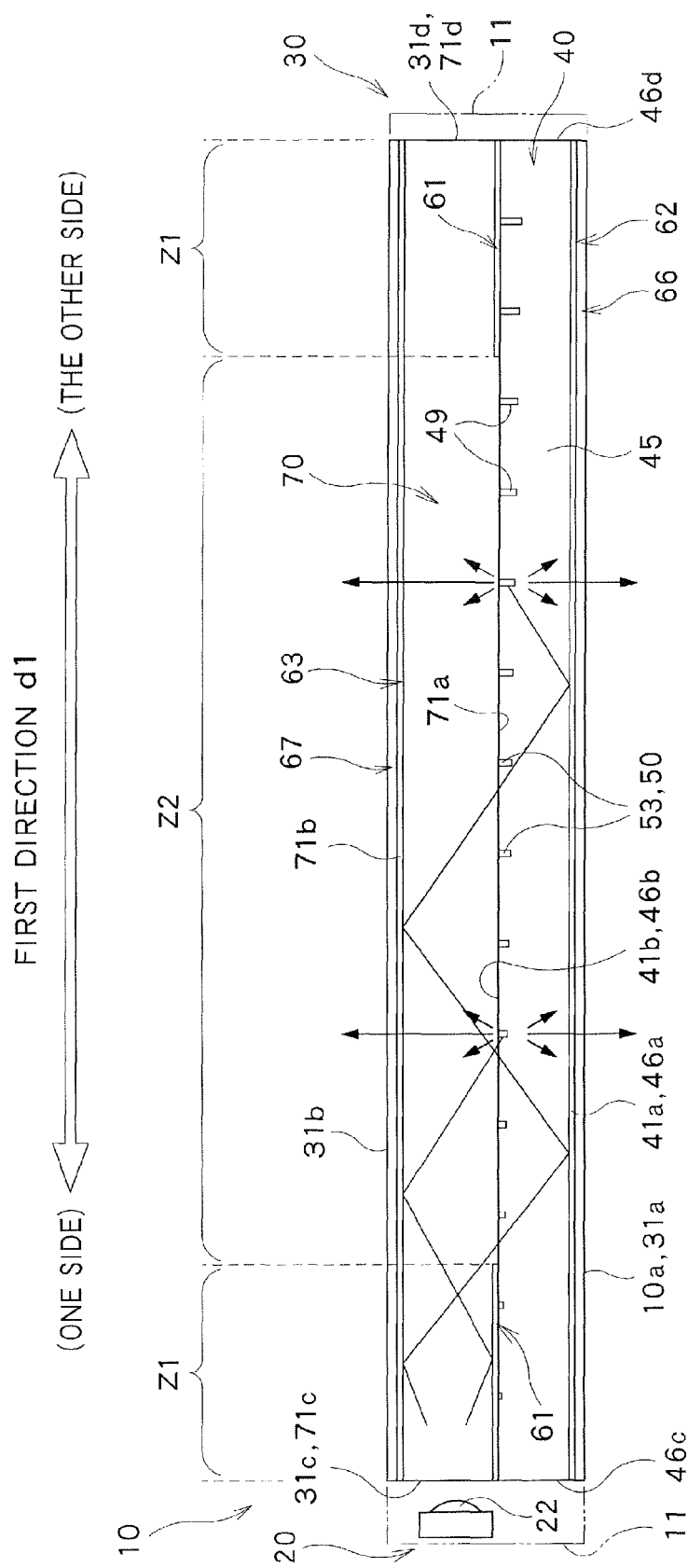
FIG. 10 is a diagram corresponding to FIG. 6, showing another variation of the light guide plate.

Though in the above-described second embodiment the second main surface 31b of the light guide plate 30 is covered with the casing 11, and only the first main surface 31a of the light guide plate 30 emits light, the present invention is not limited to such a construction. As shown in FIG. 10, both the first main surface 31a and the second main surface 31b of the light guide plate 30 may emit light. Thus, the illumination apparatus 10 may have a pair of opposing light emitting surfaces.

In the above-described second embodiment, the first main surface 31a of the light guide plate 30 forms the light emitting surface 10a of the illumination apparatus 10; however, the present invention is not limited to such a construction. A deflecting means for deflecting light that has exited the light guide plate 30 may be provided at a position opposite the first main surface 31a of the light guide plate 30, the deflecting means forming the light emitting surface 10a of the illumination apparatus 10. The deflecting means can be exemplified by a light condensing sheet (light collecting sheet) having a prism surface or lens surface on the light exit side.

The present invention is not limited to the construction of the extracting light guide layer 40 and the extracting elements 53, described above with reference to the second embodiment: various known extracting elements, which have been used in conventional light guide plates, can be used as the extracting elements 53. For example, the extracting light guide layer 40 may comprise a sheet-like matrix and a diffusing component dispersed in the matrix. The diffusing component, which functions as extracting elements 53, is provided in that region of the extracting light guide layer 40 which faces both the first zone Z1 and the second zone Z2. Such an extracting light guide layer 40 can also obscure the extracting elements 53 in the light guide plate 30 having a luminous area and a non-luminous area.

The modifications described above can of course be made in an appropriate combination to the above-described second embodiment.

The invention claimed is:

1. A light guide plate comprising:
    an extracting light guide layer including a base portion having a pair of main surfaces; and
    light diffusing portions provided in the base portion;

wherein two adjacent light diffusing portions, lying next to each other in a first direction, satisfy the following relationship:

$$\tan(\operatorname{Arcsin}(n_L/n)) \leq d/(h_1+h_2),$$

where d is a distance between the two light diffusing portions in the first direction, $h_1$ and $h_2$ are heights of the two light diffusing portions in a normal direction of the extracting light guide layer, n is the refractive index of the extracting light guide layer, and $n_L$ is the refractive index of a layer lying adjacent to the extracting light guide layer and superimposed on one of the main surfaces.

2. The light guide plate according to claim 1, wherein heights of the light diffusing portions in a normal direction of the extracting light guide layer are not equal.

3. The light guide plate according to claim 1, wherein a height of at least one light diffusing portion in a normal direction of the extracting light guide layer is higher than a height of at least one other light diffusing portion located on one side in a first direction with respect to the one light diffusing portion.

4. The light guide plate according to claim 1, wherein a height of a light diffusing portion in a normal direction of the extracting light guide layer is not lower than a height of any other light diffusing portion located on one side in a first direction with respect to the light diffusing portion.

5. The light guide plate according to claim 1, further comprising a low-refractive index layer disposed adjacent to the extracting light guide layer and having a lower refractive index than a refractive index of the base portion of the extracting light guide layer.

6. The light guide plate according to claim 5, further comprising a cover layer disposed on the opposite side of the low-refractive index layer from the extracting light guide layer,
wherein the low-refractive index layer is a layer to bond the extracting light guide layer and the cover layer together.

7. The light guide plate according to claim 6, wherein the cover layer has higher scratch resistance than a scratch resistance of the base portion of the extracting light guide layer.

8. The light guide plate according to claim 1, wherein grooves, arranged in the first direction with a space, are formed in one of the pair of main surfaces of the base portion, and
wherein the light diffusing portions are provided in the grooves.

9. The light guide plate according to claim 1, wherein each light diffusing portion extends linearly in a direction not parallel to the first direction.

10. An illumination apparatus comprising:
the light guide plate according to claim 1; and
a light source disposed in a position facing a light entrance-side surface of the light guide plate.

11. A light guide plate comprising:
a main light guide layer having a first main surface and a second main surface which oppose each other;
a low-refractive index layer provided on the first main surface of the main light guide layer and having a lower refractive index than a refractive index of the main light guide layer; and
an extracting light guide layer superimposed on the main light guide layer from a side of the low-refractive index layer,
wherein the first main surface includes a first zone and a second zone, and the low-refractive index layer is provided only on the first zone of the first main surface,
wherein the extracting light guide layer has extracting elements, arranged in a first direction, for changing the traveling direction of light from the main light guide layer,
wherein the extracting elements are provided in a region facing both the first zone and the second zone,
wherein the extracting elements are disposed adjacent to the second zone of the main light guide layer, and
wherein a difference in refractive index between the extracting elements and the main light guide layer is smaller than a difference in refractive index between the low-refractive index layer and the main light guide layer.

12. The light guide plate according to claim 11, wherein the extracting light guide layer further has a base portion having a pair of main surfaces, and
wherein the extracting elements are light diffusing portions provided in the base portion.

13. The light guide plate according to claim 12, wherein heights of the extracting elements in a normal direction of the extracting light guide layer are not equal.

14. The light guide plate according to claim 12, wherein a height of at least one extracting element in a normal direction of the extracting light guide layer is higher than a height of at least one other extracting element located on one side in the first direction with respect to the one light diffusing portion.

15. The light guide plate according to claim 12, wherein a height of an extracting element in a normal direction of the extracting light guide layer is not lower than a height of any other extracting element located on one side in the first direction with respect to the light diffusing portion.

16. The light guide plate according to claim 12, wherein grooves, arranged in the first direction with a space, are formed in one of the pair of main surfaces of the extracting light guide layer, and
wherein the extracting elements are light diffusing portions formed in the grooves.

17. The light guide plate according to claim 11, wherein each extracting element extends linearly in a direction not parallel to the first direction.

18. An illumination apparatus comprising:
the light guide plate according to claim 11; and
a light source disposed in a position facing a light entrance-side surface of the light guide plate.

* * * * *